United States Patent
Kavala et al.

(10) Patent No.: US 12,462,857 B2
(45) Date of Patent: Nov. 4, 2025

(54) NONVOLATILE MEMORY PACKAGE, STORAGE DEVICE INCLUDING THE SAME, AND METHOD OF OPERATING THEREOF

(71) Applicant: Samsung Electronics Co., Ltd., Suwon-si (KR)

(72) Inventors: Anil Kavala, Yongin-si (KR); Youngmin Jo, Suwon-si (KR); Jungjune Park, Suwon-si (KR); Chiweon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 18/529,619

(22) Filed: Dec. 5, 2023

(65) Prior Publication Data

US 2024/0312551 A1    Sep. 19, 2024

(30) Foreign Application Priority Data

Mar. 14, 2023    (KR) .................. 10-2023-0033038

(51) Int. Cl.
*G11C 7/22* (2006.01)
*G11C 16/32* (2006.01)

(52) U.S. Cl.
CPC .................. *G11C 7/22* (2013.01); *G11C 7/222* (2013.01); *G11C 16/32* (2013.01)

(58) Field of Classification Search
CPC ........... G11C 7/22; G11C 7/222; G11C 16/32; G11C 29/022; G11C 29/023; G11C 29/028; G11C 29/1201; G11C 29/38; G11C 29/46; G11C 2029/4002; G11C 29/56; G11C 16/10; G06F 1/06; G06F 3/061; G06F 3/0679
See application file for complete search history.

(56) References Cited

U.S. PATENT DOCUMENTS

| | | |
|---|---|---|
| 7,567,880 B2 | 7/2009 | Iizuka |
| 8,599,641 B2 | 12/2013 | Yoko et al. |
| 8,930,740 B2 | 1/2015 | Zerbe et al. |
| 10,740,033 B2 | 8/2020 | Kim et al. |
| 11,736,098 B2 | 8/2023 | Kim et al. |
| 2010/0293406 A1* | 11/2010 | Welker .............. G06F 13/1689 713/401 |
| 2022/0317933 A1 | 10/2022 | Kim et al. |

FOREIGN PATENT DOCUMENTS

| | | |
|---|---|---|
| JP | 2015-179380 A | 10/2015 |
| KR | 10-1746203 B1 | 6/2017 |

* cited by examiner

*Primary Examiner* — Jay W. Radke
(74) *Attorney, Agent, or Firm* — Muir Patent Law, PLLC

(57) ABSTRACT

A storage device includes a plurality of memory chips, a buffer chip connected to the plurality of memory chips, and a controller connected to the buffer chip. The buffer chip is configured to periodically receive a first command from the controller, and perform a DQS oscillator enable operation in response to the first command. At least one memory chip among the plurality of memory chips and the buffer chip are configured to perform write training or read training when the DQS oscillator enable operation is performed.

20 Claims, 16 Drawing Sheets

NONVOLATILE MEMORY PACKAGE, STORAGE DEVICE INCLUDING THE SAME, AND METHOD OF OPERATING THEREOF

CROSS-REFERENCE TO RELATED APPLICATION(S)

This application claims benefit of priority to Korean Patent Application No. 10-2023-0033038 filed on Mar. 14, 2023 in the Korean Intellectual Property Office, the disclosure of which is incorporated herein by reference in its entirety.

BACKGROUND

The present inventive concept relates to a nonvolatile memory package, a storage device including the nonvolatile memory package, and a method of operating the storage device. In general, a memory package includes a plurality of memory chips mounted on a package substrate. A storage device may include at least one memory package. The storage device includes a controller for controlling the memory package. The controller may control the plurality of memory chips via a buffer chip included in the memory package. As data storage space required by various electronic devices increases, there is a growing demand for a memory package in which a buffer chip and memory chips are disposed, and for a storage device including such a memory package.

SUMMARY

An aspect of the present inventive concept provides a nonvolatile memory package performing hidden training, a storage device including the same, and a method of operating the same.

In accordance with an aspect of the disclosure, a storage device includes a plurality of memory chips; a buffer chip connected to the plurality of memory chips; and a controller connected to the buffer chip, wherein the buffer chip is configured to periodically receive a first command from the controller, and perform a DQS oscillator enable operation in response to the first command, and at least one memory chip among the plurality of memory chips and the buffer chip are configured to perform write training or read training when the DQS oscillator enable operation is performed.

In accordance with an aspect of the disclosure, a method of operating a storage device includes performing a DQS oscillator enable/disable operation between a controller and a buffer chip; and performing training between a memory chip and the buffer chip using a DQS oscillator clock generated by the buffer chip or the memory chip while performing the DQS oscillator enable/disable operation.

In accordance with an aspect of the disclosure, a nonvolatile memory package includes a plurality of memory chips; and a buffer chip connected to the plurality of memory chips, wherein the buffer chip includes: a first sampler configured to sample read data transmitted from one of the plurality of memory chips when a read operation is performed; a second sampler configured to sample write data transmitted from an external device when a program operation is performed; a DQS oscillator configured to generate a strobe clock DQS in response to a first command; and a counter and register configured to count the strobe clock DQS and store a counted value, and wherein when the DQS oscillator is enabled in response to the first command, the buffer chip and at least one of the plurality of memory chips perform hidden read training or hidden write training.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, example embodiments of the present inventive concept will be described clearly and specifically such that a person skilled in the art could easily carry out example embodiments using the drawings.

A recent memory interface (for example, Toggle 6.0) may support un-matched DQS oscillator training. Accordingly, hidden write/read training between slave chips (buffer chip/ memory chip) may be necessary when a DQS oscillator is performed between a controller and a buffer chip. However, after a power supply is turned on, an existing nonvolatile memory package may not perform training between the buffer chip and a memory die.

In a nonvolatile memory package, a storage device including the same, and a method of operating the same according to an example embodiment, hidden read training and hidden write training may be performed between the buffer chip and the memory chip using a DQS oscillator clock.

Figure 1:
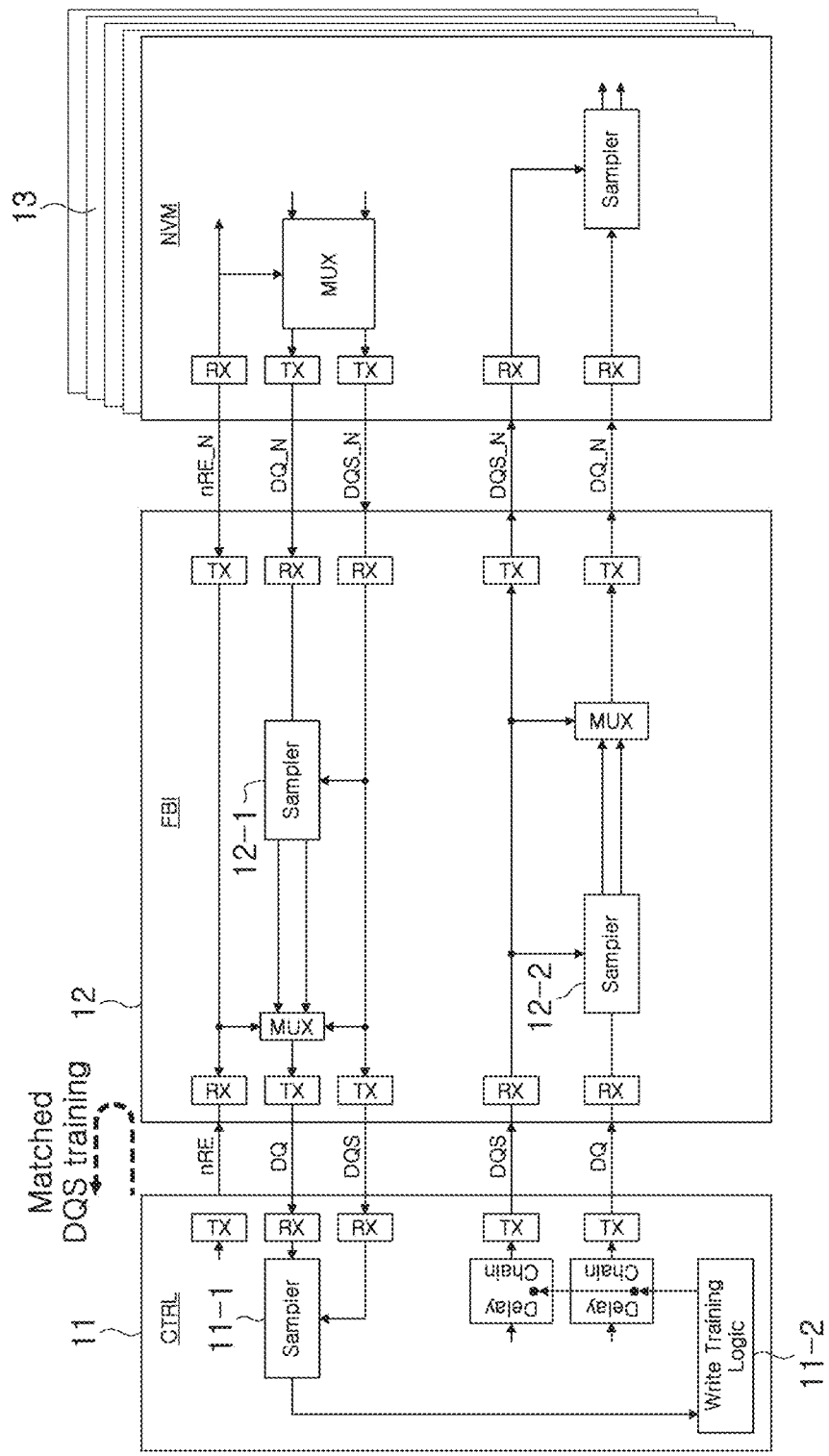
FIG. 1 is a diagram illustrating a conventional storage device 1.

FIG. 1 is a diagram illustrating a general storage device 1. Referring to FIG. 1, the storage device 1 may include a controller CTRL 11, a buffer chip FBI 12, and memory chips (NVM) 13. Here, the buffer chip 12 and the memory chips 13 may be referred to as a nonvolatile memory package.

The controller 11 may perform a predetermined training operation after power is supplied to the nonvolatile memory package. For example, the training operation may include a ZQ calibration operation, a duty cycle correction (DCC) operation, read training, or write training. The ZQ calibration operation may be performed on each of the memory chips 13 in response to a ZQ calibration command via a ZQ pin, and may control impedance matching of channels. The DCC operation may adjust a duty of a clock signal. The DCC operation may include adjustment of duty cycles of clock signals of the memory chips 13 and adjustment of a duty cycle of a clock signal of the buffer chip 12. The controller 11 may transmit a read enable signal nRE to the nonvolatile memory package to perform the training operation.

When the training operation is performed, the buffer chip 12 may receive nRE from the controller 11, and may transmit nRE_N to a corresponding memory chip NVM. The buffer chip 12 may include a first sampler 12-1 and a second sampler 12-2. The first sampler 12-1 may sample a data signal DQ_N at every rising edge or falling edge of a data strobe clock signal DQS_N of the memory chip NVM, and may output sampled data DQ to the controller 11. The second sampler 12-2 may sample the data signal DQ in response to the data strobe clock signal DQS from the controller 11, and may transmit sampled data DQ_N to the corresponding memory chip NVM in response to the data strobe clock signal DQS_N.

A sampler 11-1 of the controller 11 may sample the data DQ according to the training operation and may transmit a result thereof to a training logic 11-2. The training logic 11-2 may correct offsets of the data DQ and the data strobe clock DQS by adjusting delays according to a sampling result.

As illustrated in FIG. 1, the storage device 1 may perform matched DQS training between the controller 11 and the buffer chip 12, but may not perform matched DQS I/F training between the memory chip 13 and the buffer chip 12.

Figure 2:
FIG. 2 is a diagram illustrating a training operation process of the storage device 1 illustrated in FIG. 1.

FIG. 2 is a diagram illustrating a training operation process of the storage device 1 illustrated in FIG. 1. Referring to FIG. 2, the storage device 1 may perform a ZQ calibration operation when power PWR is supplied to a nonvolatile memory package, then may perform a DCC operation on memory chips NVM, then may perform a DCC operation on the buffer chip 12, and then may perform a read/write training operation.

The general storage device 1 may perform read and write training between the controller 11 and the buffer chip 12, but may not perform hidden training between the buffer chip 12 and the memory chips 13.

Conversely, in a nonvolatile memory package, a storage device including the same, and a method of operating the same according to an example embodiment, hidden read training and write training may be performed, using a DQS oscillator clock, between a buffer chip FBI and a memory chip NVM. In the nonvolatile memory package, the storage device including the same, and the method of operating the same according to an example embodiment, the memory chip NVM may output expected data and a strobe clock DQS_N, using the DQS oscillator clock, from an operation pattern of a DQS oscillator, and the buffer chip FBI may train a phase difference between data of the memory chip NVM and the strobe clock.

In the nonvolatile memory package, the storage device including the same, and the method of operating the same according to an example embodiment, periodic monitoring of the DQS oscillator may be performed while read DQS training is performed between the buffer chip FBI and the memory chip NVM, thereby improving sampler timing margin of the buffer chip FBI. As a result, a read rate may be improved.

Figure 3:
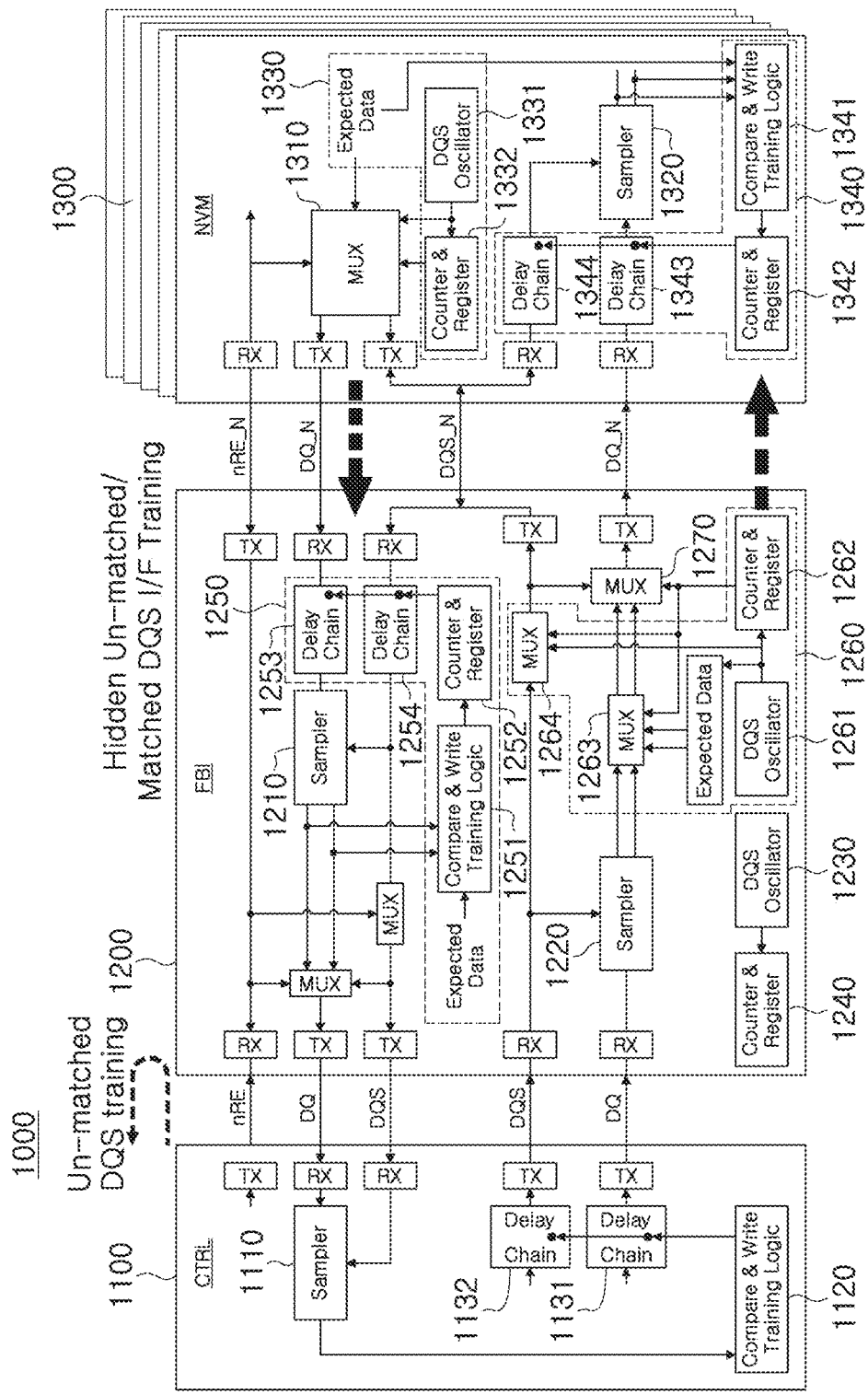
FIG. 3 is a diagram illustrating a storage device 1000 according to an example embodiment.

FIG. 3 is a diagram illustrating a storage device 1000 according to an example embodiment. Referring to FIG. 3, the storage device 1000 may include a controller 1100, a buffer chip 1200, and a plurality of memory chips 1300. Here, the buffer chip 1200 and the plurality of memory chips 1300 may be collectively referred to as a nonvolatile memory package.

The controller 1100 may be implemented to control overall operations of the storage device 1000. The controller 1100 may include a sampler 1110, a training logic 1120, and first and second delay chains 1131 and 1132. The controller 1100 may perform un-matched DQS training with the buffer chip 1200.

The buffer chip 1200 may be implemented to communicate with the controller 1100 according to a first nonvolatile memory interface. Here, the first nonvolatile memory interface may be a Joint Electron Device Engineering Council (JEDEC) or Open NAND Flash Interface (ONFI) standard interface. The buffer chip 1200 may perform hidden un-matched/matched DQS interface training with the plurality of memory chips 1300.

The buffer chip 1200 may include samplers 1210 and 1220, a DQS oscillator 1230, a counter and register 1240, a first training circuit 1250, a second training circuit 1260, and a multiplexer 1270. The first training circuit 1250 may include a compare and write training logic 1251, a counter and register 1252, and delay chains 1253 and 1254. The second training circuit 1260 may include a DQS oscillator 1261, a counter and counter and register 1262, and multiplexers 1263 and 1264.

Each of the plurality of memory chips 1300 may be implemented to communicate with the buffer chip 1200 according to a second nonvolatile memory interface. Here, the second nonvolatile memory interface may be a JEDEC or ONFI standard interface. In an example embodiment, the second nonvolatile memory interface may be the same as the first nonvolatile memory interface. In another example embodiment, the second nonvolatile memory interface may be different from the first nonvolatile memory interface.

One memory chip NVM, among the plurality of memory chips 1300, may include a multiplexer 1310, a sampler 1320, a first training circuit 1330, and a second training circuit 1340. The first training circuit 1330 may include a DQS oscillator 1331 and a counter and register 1332. The second training circuit 1340 may include a compare and write training logic 1341, a counter and register 1342, and delay chains 1343 and 1344.

In addition, while the DQS oscillator 1230 is periodically enabled, hidden read/write training may be performed between the memory chip NVM and the buffer chip FBI. Read training and write training may be sequentially performed as follows.

First, a read training operation between the buffer chip 1200 and the memory chips 1300 may be performed as follows. When the controller 1100 periodically issues a specific command (for example, a DQS oscillator CMD), a hidden read training loop may be enabled between the buffer chip FBI and the memory chip NVM. Here, the read training loop may be implemented by the first training circuit 1250 of the buffer chip FBI and the first training circuit 1330 of the memory chip NVM. That is, a read training path of a buffer chip 1200 may include expected data, a compare and write training logic circuit 1251, a counter and register 1252, delay chains 1253 and 1254, and a sampler 1210. In addition, the read training path of a memory chip NVM may include expected data, a DQS oscillator 1331, a counter and register 1332, and a multiplexer 1310.

The buffer chip 1200 (controller side) may enable a controller DQS oscillator 1230, and a controller/master chip may perform a count monitoring operation, thereby performing read training between the buffer chip 1200 and the memory chips 1300 while checking whether to perform write training with a difference in count from a reference count. Here, the read training operation may be performed using a DQS oscillator clock of the memory chip NVM as a read clock via a DQS clock of the memory chip NVM and DQ expected data. A phase difference error between a DQS clock and expected data may be compensated for by the sampler 1210, the compare and write training logic 1251, the counter and register 1252, and the delay chains 1253 and 1254. Expected data received from the memory chip NVM may include a toggle/random data pattern.

An optimized delay code corresponding to all memory chips 1300 may be stored in each counter and register 1252 of the buffer chip 1200. Such hidden read training may be performed as DQS oscillator training of the buffer chip 1200 by the controller 1100. Such hidden read training may be performed by a command of the controller 1100 while a buffer chip DQS oscillator training enable and count monitoring operation is performed regardless of necessity/requirement.

Second, write training may be performed by the buffer chip 1200 and the memory chips 1300 as follows. When the controller 1100 periodically issues the DQS oscillator CMD, a hidden write training loop may be enabled between the buffer chip FBI and the memory chip NVM. Here, the write training loop may be implemented by the second training circuit 1260 of the buffer chip FBI and the second training circuit 1340 of the memory chip NVM. That is, a write training path of a memory chip NVM may include expected data, a compare and write training logic 1341, a counter and register 1342, delay chains 1343 and 1344, and a sampler 1320. A write training path of the buffer chip FBI may include expected data, a DQS oscillator 1261, a counter and register 1262, and a multiplexer 1263.

The buffer chip 1200 (controller side) may determine whether to perform write training by checking a difference in counter from a reference count while a DQS oscillator enable operation of the controller and the count monitoring operation of the controller/master chip are performed, and may perform write training between the buffer chip 1200 and the memory chips 1300.

A clock of the DQS oscillator 1261 of the buffer chip 1200 (memory chip side) may be used as a write clock via a buffer chip DQS clock and DQ expected data, thereby performing a write training operation. A phase difference error between a DQS clock and data may be compensated for by the sampler 1320, the compare and write training logic 1341, the counter and register 1342, and the delay chains 1343 and 1344. Expected data received from the memory chip NVM may be a Toggle/Random data pattern. An optimized delay code corresponding to all memory chips may be stored in a corresponding register of the memory chip NVM.

Such hidden write training may be performed while the buffer chip DQS oscillator training enable and count monitoring operation is performed according to a command of the controller 1100 regardless of necessity/requirement. Expected data of the buffer chip FBI may be transmitted to a receiver RX of the memory chip NVM. The compare and write training logic 1341 may compare with the expected data. The counter and register 1342 may generate a sampling success/failure result according to a compare result. The delay chains 1343 and 1344 may be delayed according to the success/failure result, thereby allowing phases of the strobe clock DQS_N and the data DQ_N to be aligned to the center of a valid window of the data. Here, the expected data may be a random data pattern to be trained for an inter symbol interference (ISI) pattern.

The storage device 1000 according to an example embodiment may perform hidden read and write training between the buffer chip 1200 and memory chips 1300, while the controller 1100 buffers chip DQS oscillator performs training using the DQS oscillator clock to improve a data valid window. In addition, the storage device 1000 according to an example embodiment may perform hidden training between slave chips (for example, the buffer chip 1200 and the memory chips 1300), when a DQS oscillator enable and count monitoring operation is performed between the controller 1100 and the buffer chips 1200.

The storage device 1000 according to an example embodiment may use the DQS oscillator clock between the buffer chip 1200 and the memory chips 1300 in hidden read/write training, such that a clock of the master/controller chip may not be necessary. All data and clocks received from the memory chip NVM in hidden training may be in a format of toggle or random data (e.g., test data). The received data may be compared to expected data using a compare and write training logic. The storage device 1000 according to an example embodiment may allow training for each memory die and each pin. In addition, all codes according to training results may be stored in respective die registers. In addition, a corresponding die register may be invoked when selected by chip selection. The storage device 1000 according to an example embodiment may perform both read training for the buffer chip 1200 and write training for the memory chips 1300.

Figure 4:
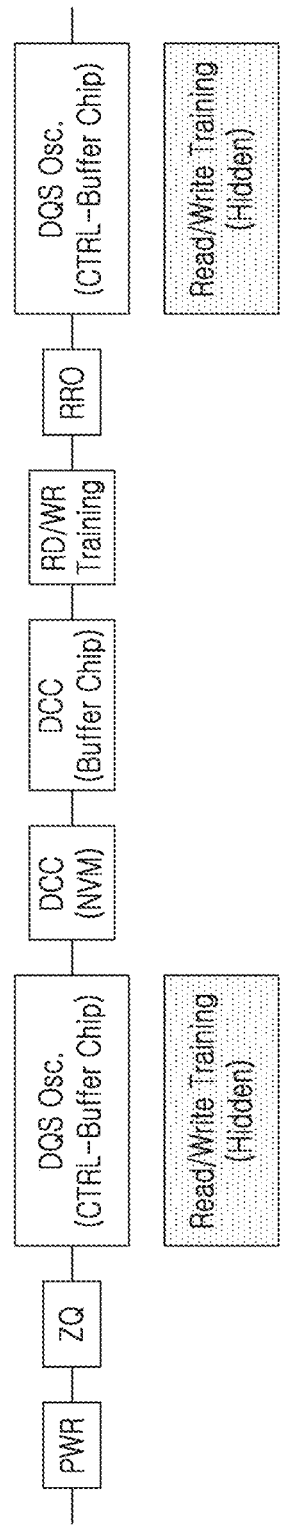
FIG. 4 is a diagram illustrating a read and write training process of the storage device 1000 illustrated in FIG. 3.

FIG. 4 is a diagram illustrating a read/write training process of the storage device 1000 illustrated in FIG. 3.

Referring to FIG. 4, the storage device 1000 may perform a ZQ calibration operation and periodically perform a DQS oscillator enable operation when power PWR is supplied to a nonvolatile memory package. Here, the DQS oscillator enable operation may be performed between the controller 1100 and the buffer chip 1200. While a DQS oscillator is enabled, hidden read/write training may be performed between the buffer chip 1200 and the memory chips 1300. Thereafter, a DCC operation may be performed on the memory chips 1300, the DCC operation may be performed on the buffer chip 12, and then a read/write training operation may be performed between the controller 1100 and the buffer chip 1200. Thereafter, enabling of the DQS oscillator may be restarted after a predetermined period of time (RRO) elapses. In this case, hidden read/write training may be simultaneously performed between the buffer chip 1200 and the memory chips 1300.

The storage device 1000 illustrated in FIGS. 3 and 4 may perform both hidden write training and hidden read training. However, the present inventive concept need not be limited thereto. The storage device according to the present inventive concept may be implemented to separately perform only one of hidden write training and hidden read training.

Figure 5:
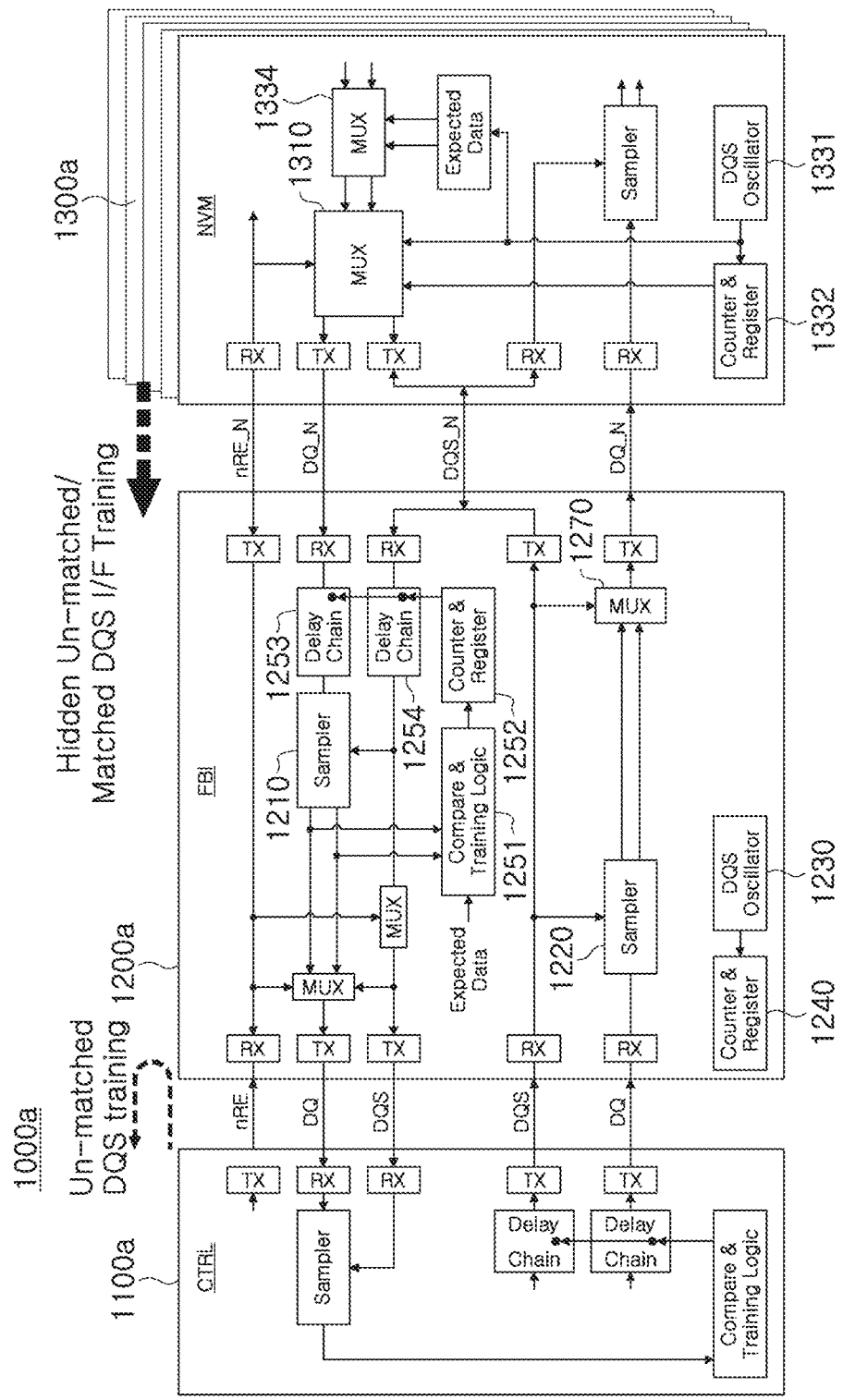
FIG. 5 is a diagram illustrating a storage device 1000a according to an example embodiment.

FIG. 5 is a diagram illustrating a storage device 1000a according to an example embodiment. Referring to FIG. 5, the storage device 1000a may include a controller 1100a, a buffer chip 1200a, and memory chips 1300a.

The storage device 1000a may implement the buffer chip 1200a and the memory chips 1300a to perform only hidden read training while the storage device 1000 illustrated in FIG. 3 periodically enables a DQS oscillator.

Toggle 6.0, a new NAND flash memory interface, may support an additional function of ON/OFF of the DQS oscillator using CMD, and may determine whether to perform write training for un-matched DQS clock I/F by monitoring a corresponding count. Accordingly, the controller 1100a may periodically enable the DQS oscillator and monitor count data. When the controller 1100a issues a DQS oscillator CMD, a hidden read training loop may be enabled between the buffer chip 1200a and the memory chips 1300a. Here, the hidden read training loop may include a sampler 1210 of the buffer chip 1200a, delay chains 1253 and 1254, a compare and training logic 1251 (e.g., a compare and read training logic and/or a compare and write training logic), a counter and register 1252, expected data, a DQS oscillator 1331 of the memory chip NVM, and a counter and register 1332.

The DQS oscillator 1331 and the counter and register 1332 of the memory chip NVM may be enabled with the same CMD, thereby generating a strobe clock for a read training operation. Expected data of the memory chip NVM may be transmitted to a receiver RX of the buffer chip 1200a. A comparison and training logic 1251 of the buffer chip 1200a may perform comparison with expected data. The counter and register 1252 may generate a pass/failure result according to a comparison result. The delay chains 1253 and 1254 may perform delay according to the pass/failure. Thus, phases of a strobe clock and data may be aligned to the center of a valid window of the data.

In an example embodiment, an optimized delay code corresponding to all pins of a memory chip may be stored in die/chip registers of each pin and buffer chip. Such hidden training may be performed by a buffer chip DQS oscillator training period monitoring command in all controllers. DQS oscillator training and monitoring may be periodically performed regardless of necessity.

Figure 6:
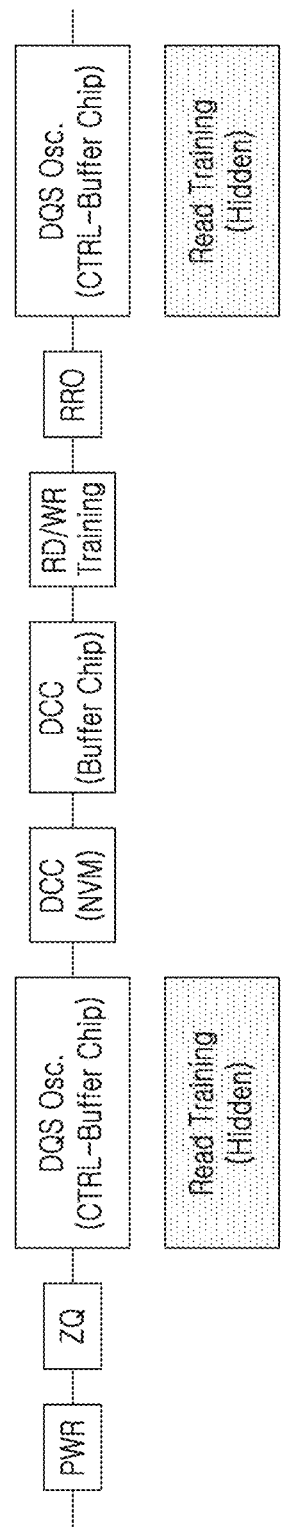
FIG. 6 is a diagram illustrating a read training process of the storage device 1000a illustrated in FIG. 5.

FIG. 6 is a diagram illustrating a read training process of the storage device 1000a illustrated in FIG. 5. Referring to FIG. 6, the storage device 1000a may perform only hidden read training as compared to the read and write training process described with reference to FIG. 4. That is, hidden read training may be performed in a periodic DQS oscillator enable section.

Figure 7A:
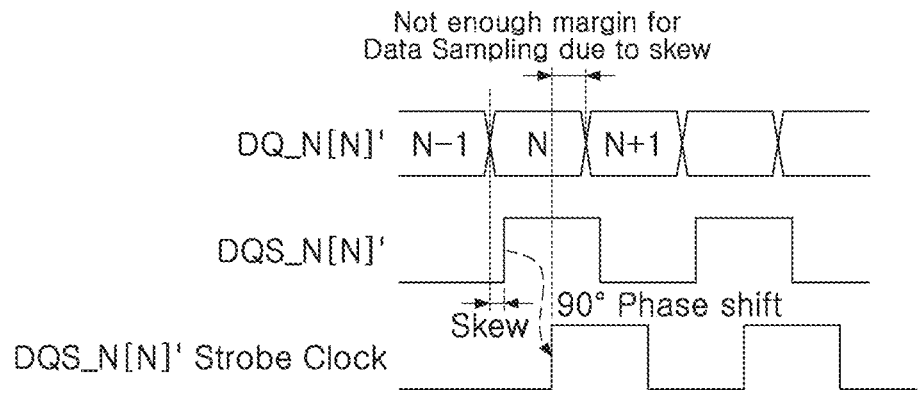
FIGS. 7A and 7B are diagrams illustrating a training process according to an example embodiment.
Figure 7B:
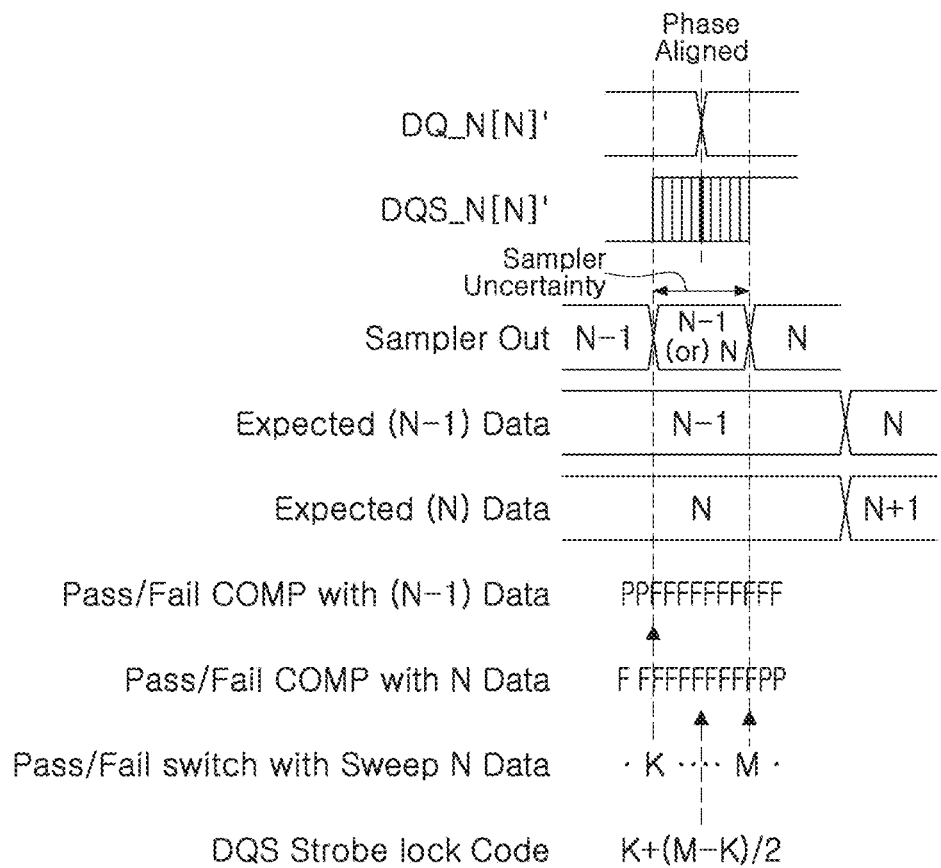

FIGS. 7A and 7B are diagrams illustrating a training process according to an example embodiment. FIG. 7A illustrates a state before training. As illustrated in FIG. 7A, phases of DQ and DQS may not be aligned due to distortion between DQ_N[N]' and DQS_N[N]'. In this example, a hold margin for data sampling may not be sufficient. FIG. 7B illustrates a state after training. A pass/failure result value of expected data may be stored via N−1 or N sampling. Sweep codes K and M corresponding to pass/failure may be stored, and a lock code K+(M−K)/2 of a strobe clock DQS may be determined.

As illustrated in FIG. 7B, a training operation may sample N−1-th or N-th random data in synchronization with a strobe clock DQS, may compare the sampled random data with N−1-th expected data to output a first pass/failure, may compare the sampled random data with N-th expected data to output a second pass/failure, may generate a first sweep code K corresponding to a conversion count value of the first pass/failure, may generate a second sweep code M corresponding to a conversion count value of the second pass/failure, and may generate a lock code of the strobe clock DQS using the first sweep code K and the second sweep code M.

The training operation according to an example embodiment may align phases of DQ and DQS after skew compensation.

Figure 8A:
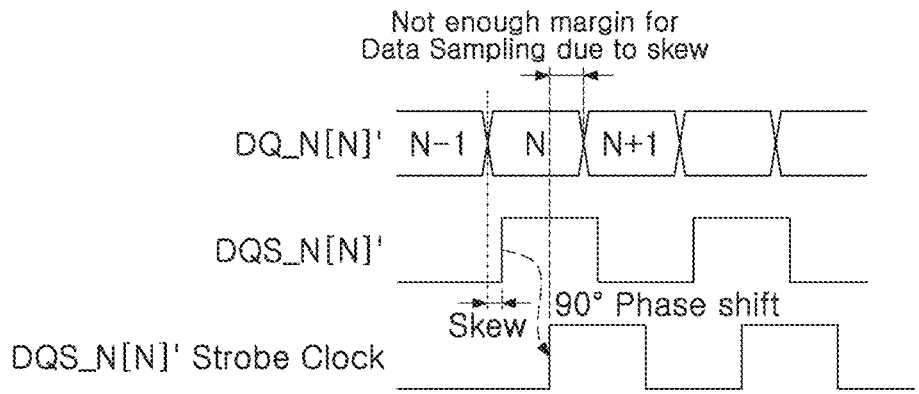
FIGS. 8A and 8B are diagrams illustrating a training process according to an example embodiment.
Figure 8B:
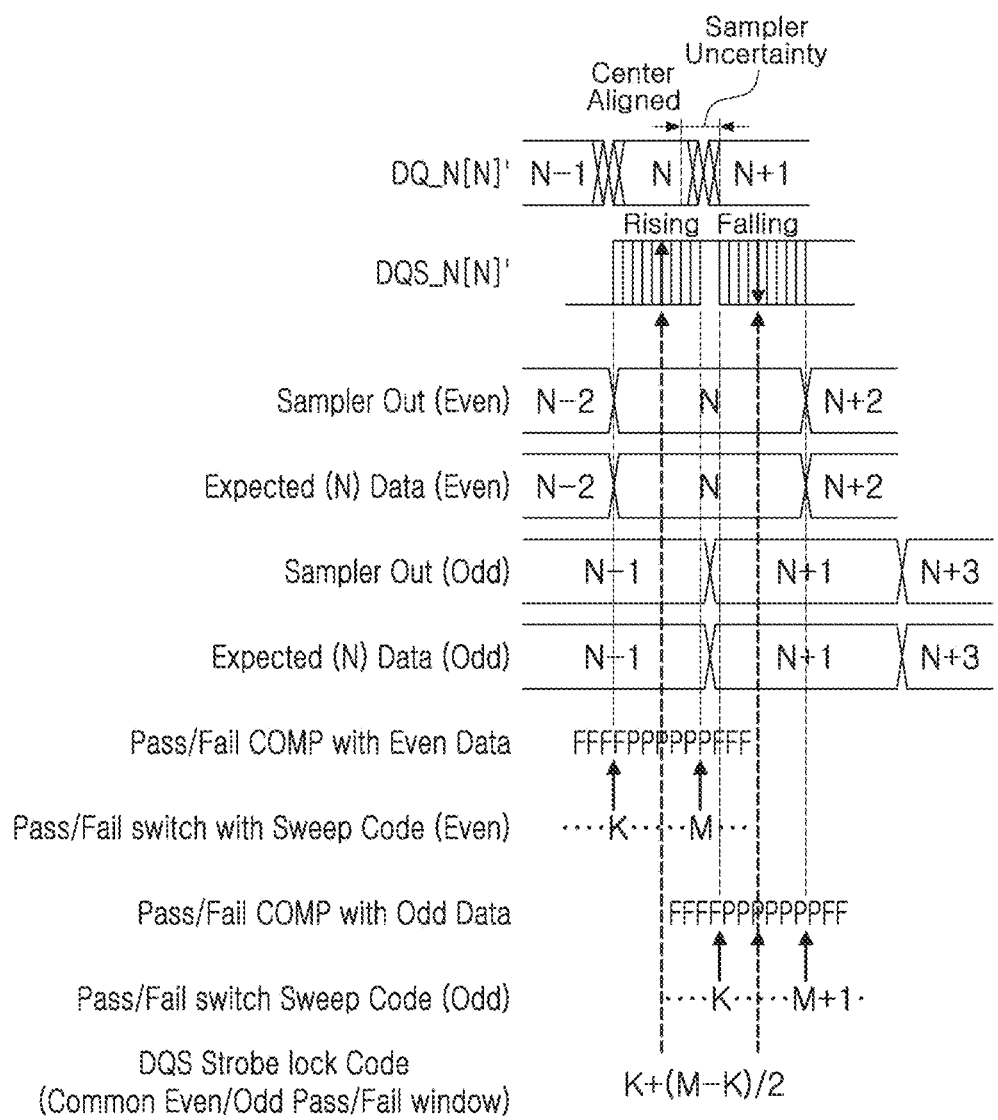

FIGS. 8A and 8B are diagrams illustrating a training process according to an example embodiment. FIG. 8A is a diagram illustrating a state before training. Referring to FIG. 8A, the phases of DQ and DQS may not be center-aligned due to distortion between DQ_N[N]' and DQS_N[N]'. Accordingly, a hold margin for data sampling may not be sufficient.

FIG. 8B is a diagram illustrating a state after training in which DQ and DQS are center-aligned after skew compensation. After sampling is performed at a rising edge, comparison with expected data may be performed, such that a pass/failure may be determined, and an even sweep code may be determined according to a pass/failure result. After sampling is performed at a falling edge, comparison with expected data may be performed, such that a pass/failure may be determined, and an odd sweep code may be determined according to a pass/failure result. A DQS strobe lock code K+(M−K)/2 corresponding to a common even/odd pass/failure window may be determined using the even sweep code and the odd sweep code.

As illustrated in FIG. 8B, a training operation may perform first sample on N-th random data DQ_N[N]' in synchronization with a rising edge of a strobe clock DQS_N, may perform second sampling on N+1-th random data DQ_N[N]' in synchronization with a falling edge of the strobe clock DQS_N, may compare the first sampled random data with N-th expected data to output a first pass/failure, may compared the second sampled random data with the N-th expected data to output a second pass/failure, may generate a first sweep code K corresponding to each of a conversion count value of the first pass/failure and a count value of the second pass/failure, may generate a second sweep code M corresponding to each of the conversion count value of the first pass/failure and the count value of the second pass/failure, and may output a lock code K+(M−K)/2 of a strobe clock DQS using the first sweep code K and the second sweep code M.

Figure 9:
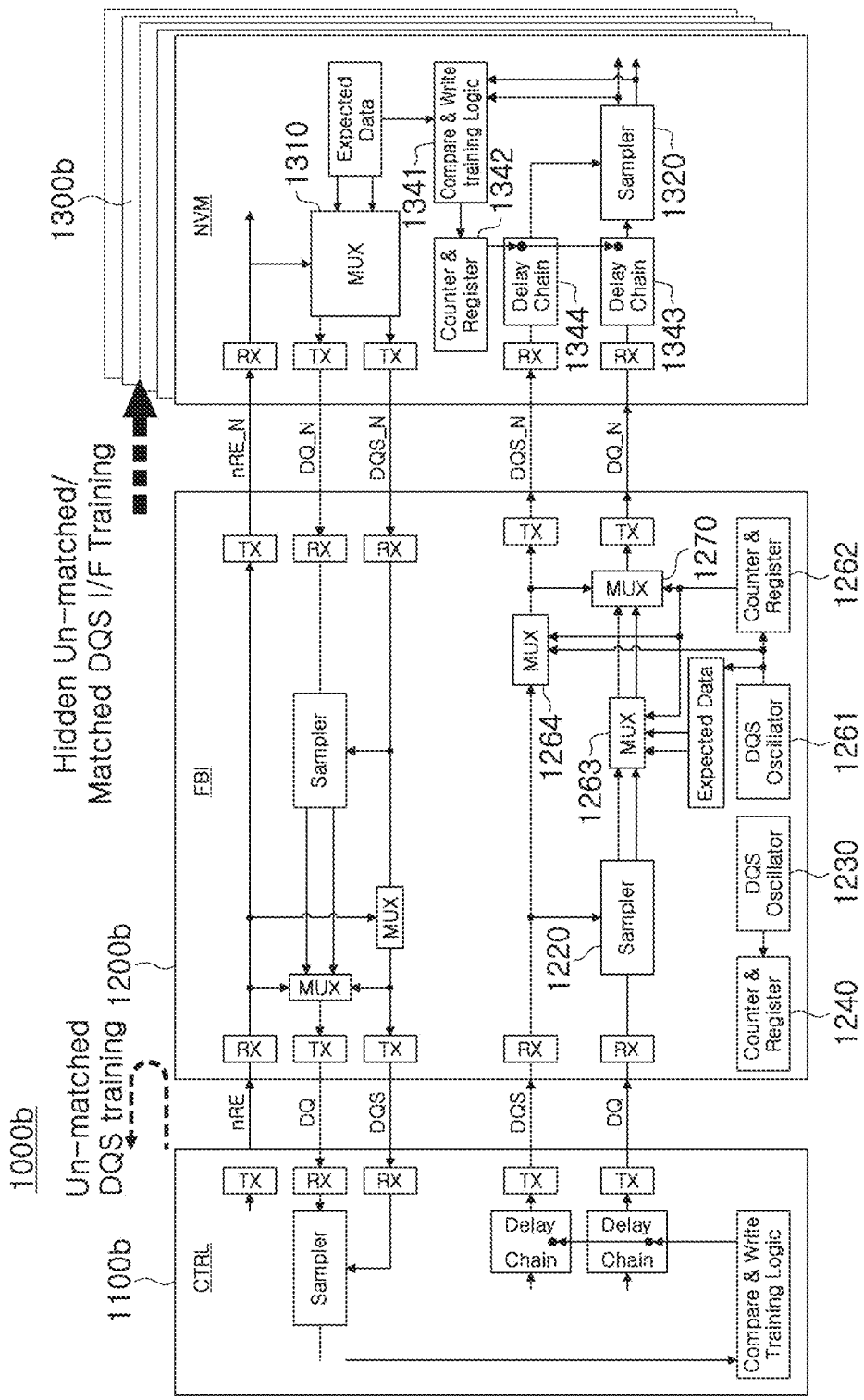
FIG. 9 is a diagram illustrating a storage device 1000b according to another example embodiment.

FIG. 9 is a diagram illustrating a storage device 1000b according to an example embodiment. Referring to FIG. 9, the storage device 1000b may include a controller 1100b, a buffer chip 1200b, and memory chips 1300b.

The storage device 1000b may implement the buffer chip 1200b and the memory chips 1300b to perform only hidden write training, while the storage device 1000 illustrated in FIG. 3 periodically enables a DQS oscillator.

When the controller 1100b issues a DQS oscillator CMD, a hidden write training loop may be enabled between the buffer chip 1200b and the memory chips 1300b. Here, the hidden write training loop may include a sampler 1320 of a memory chip NVM, a compare and write training logic 1341, a counter and register 1342, expected data, a DQS oscillator 1261 of the buffer chip 1200b, a counter and register 1262, and a multiplexer 1263. The DQS oscillator 1261 and the counter and register 1262 of the buffer chip 1200b may be enabled with the same CMD, thereby generating a strobe clock for a write training operation.

In the write training operation, expected data of the buffer chip 1200b may be transmitted to a receiver RX of the memory chip NVM. The memory chip NVM may perform comparison with the expected data. A counter may generate a pass/failure result for a comparison result, and may delay a delay chain according to the pass/failure result, thereby aligning phases of a strobe clock and data to the center of a valid window of the data.

The controller 1100b may perform hidden write training between the memory chip NVM and the buffer chip FBI during periodic training monitoring of a buffer chip DQS oscillator.

Figure 10:
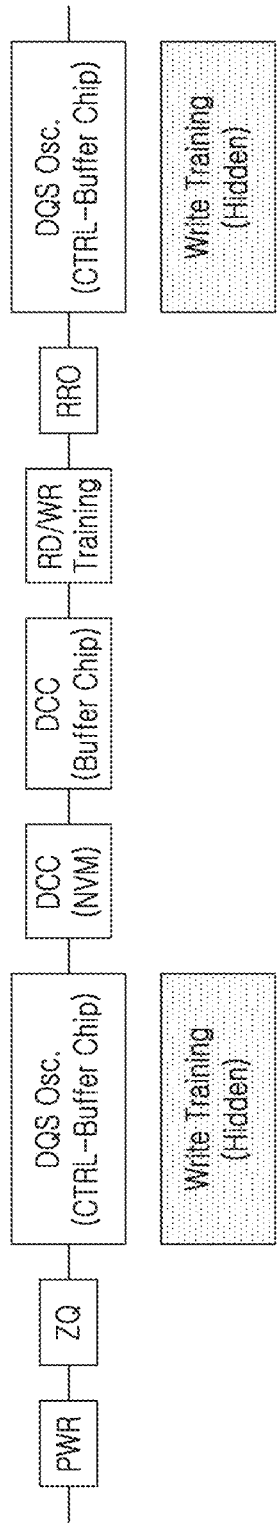
FIG. 10 is a diagram illustrating a write training process of the storage device 1000a illustrated in FIG. 9.

FIG. 10 is a diagram illustrating a write training process of the storage device 1000b illustrated in FIG. 9. Referring to FIG. 10, the storage device 1000b may perform only hidden write training as compared to the read and write training process described with reference to FIG. 4. That is, hidden write training may be performed in a periodic DQS oscillator enable section.

Figure 11:
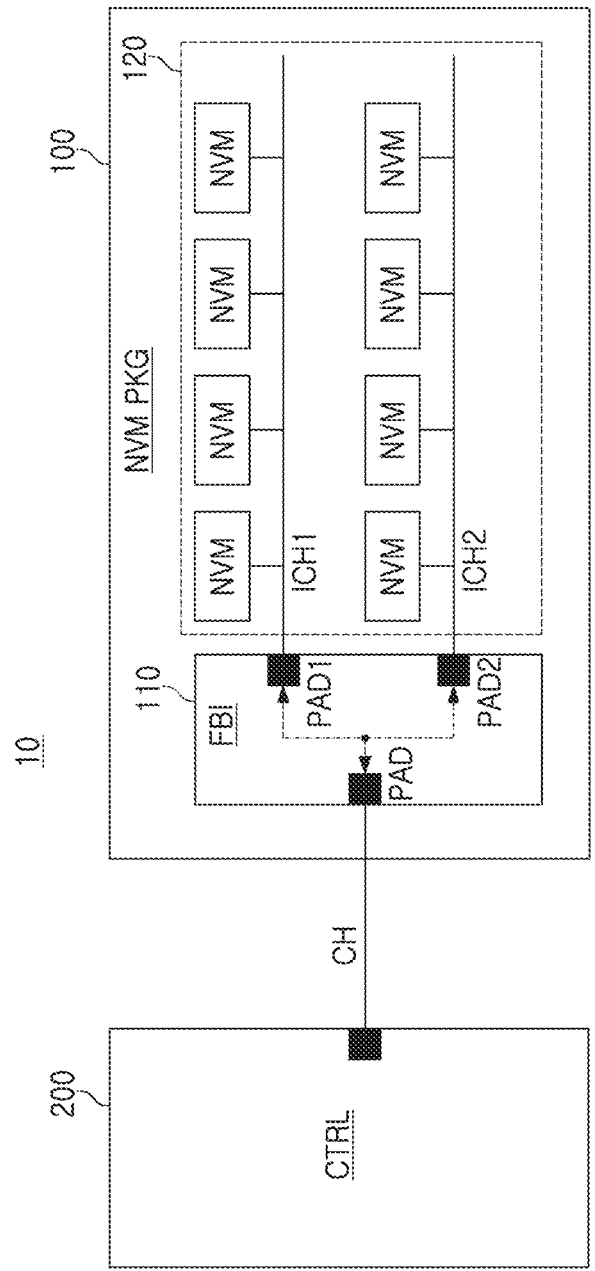
FIG. 11 is a diagram illustrating a storage device 10 according to an example embodiment.

FIG. 11 is a diagram illustrating a storage device 10 according to an example embodiment. Referring to FIG. 11, the storage device 10 may include a nonvolatile memory package (NVM PKG) 100 and a controller CTRL 200 controlling a nonvolatile memory package 100.

The nonvolatile memory package (NVM PKG) 100 may include an interface chip (frequency boosting interface chip (FBI) or "buffer chip") 110 and a plurality of nonvolatile memory devices (NVMs) 120 connected to internal channels ICH1 and ICH2. The number of internal channels ICH1 and ICH2 illustrated in FIG. 11 is two, but the number of internal channels according to the present inventive concept is not limited thereto.

The interface chip (FBI) 110 may be connected to the controller 200 through a channel CH. Here, the channel CH may be connected to a first internal channel ICH1 and/or a second internal channel ICH2 via the interface chip 110. The interface chip 110 may include a retraining check circuit internally determining the necessity for retraining. The retraining check circuit may be implemented to determine the necessity for retraining using an unselected channel among the internal channels ICH1 and ICH2. In an example embodiment, the retraining check circuit may include a built-in self-test (BIST) circuit, an oscillator, or a delayed locked loop (DLL) circuit.

The interface chip 110 may include a plurality of pads PAD connected to the channel CH. The interface chip 110 may include first pads PAD1 connected between the plurality of pads PAD and the first internal channel ICH1 and second pads PAD2 connected between the plurality of pads PAD and the second internal channel ICH2. The interface chip 110 may implement an interface protocol for communication with the controller 200 and an interface protocol for communication with each of the nonvolatile memory devices 120 in a compatible manner. For example, the interface chip 110 may communicate with the controller 200 according to a first interface protocol NIF1, and may communicate with each of the nonvolatile memory devices 120 according to a second interface protocol NIF2. Conversely, the interface chip 110 may communicate with the controller 200 according to the second interface protocol NIF2, and may communicate with each of each of the nonvolatile memory devices 120 according to the first interface protocol NIF1.

In addition, the interface chip 110 may perform a hidden read/write training operation with the nonvolatile memory devices 120 while performing a DQS oscillator enable operation, as described with reference to FIGS. 1 to 10.

Each of the nonvolatile memory devices (NVM) 120 may be implemented to store data. A plurality of nonvolatile memory devices may be connected to each of the internal channels ICH1 and ICH2. In FIG. 11, four nonvolatile memory devices may be connected to each of the internal channels ICH1 and ICH2, but the number of nonvolatile memory devices connected to the internal channels ICH1 and ICH2 of the present inventive concept is not limited thereto. In an example embodiment, the nonvolatile memory package 100 may be implemented to have a structure in which a plurality of nonvolatile memory devices (memory chips) 120 are stacked.

The controller CTRL 200 may be implemented to control overall operations of the nonvolatile memory package 100. The controller 200 may perform functions necessary for data management of the nonvolatile memory package 100, such as address mapping, error correction, garbage collection, wear-leveling, bad block management, or data correction. Here, such functions may be implemented in terms of hardware, software, or firmware.

The controller 200 may receive a retraining request received from the nonvolatile memory package 100, issue a retraining command, and transmit the retraining command to the nonvolatile memory package 100. Accordingly, the nonvolatile memory package 100 may perform a retraining operation corresponding to the unselected channel.

The storage device 10 according to an example embodiment may perform hidden read/write training in a DQS oscillator enable section.

Figure 12:
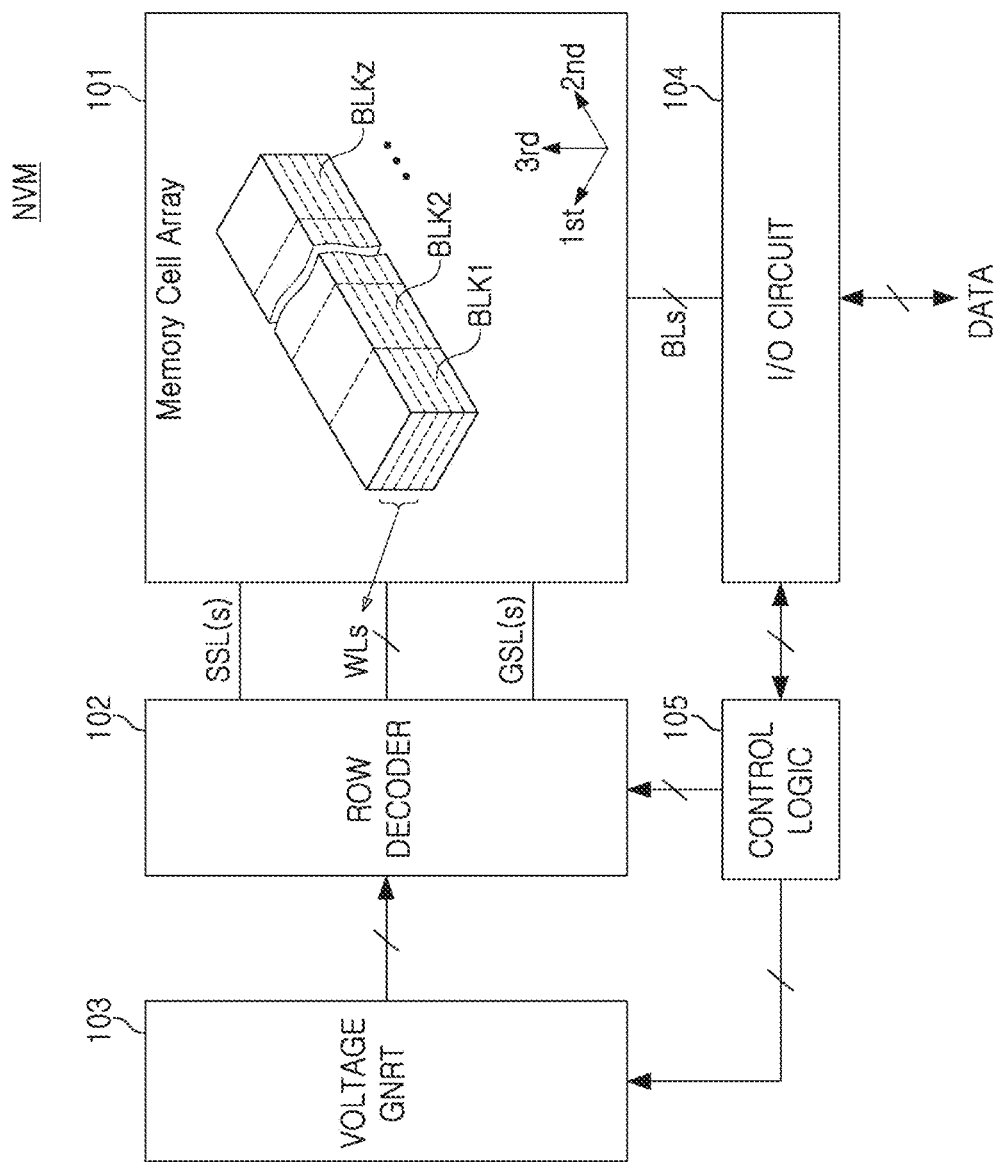
FIG. 12 is a diagram illustrating a nonvolatile memory device NVM according to an example embodiment.

FIG. 12 is a diagram illustrating a nonvolatile memory device NVM according to an example embodiment. Referring to FIG. 12, the nonvolatile memory device NVM may include a memory cell array 101, an address decoder 102, a voltage generation circuit 103, an input/output circuit 104, and a control logic 105.

The nonvolatile memory device NVM may include a NAND flash memory, a vertical NAND (VNAND) flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. Hereinafter, for ease of description, the nonvolatile memory device NVM may be referred to as a vertical NAND flash memory device.

The memory cell array 101 may include a plurality of memory blocks BLK1 to BLKz. Each of the memory blocks BLK1 to BLKz may be connected to an address decoder 102 via wordlines WLs, at least one string selection line SSL, and at least one ground selection line GSL, and may be connected to an input/output circuit 104 via bitlines BLs. In an example embodiment, the wordlines WLs may have a stacked plate-type structure.

Each of the plurality of memory blocks BLK1 to BLKz may include a plurality of strings having a three-dimensional structure, the plurality of strings arranged on a substrate in a first direction and a second direction (different from the first direction) and arranged on the substrate in a third direction (a direction perpendicular to a plane formed in the first and second directions). Here, each of the plurality of strings may include at least one string selection transistor, a plurality of memory cells, and at least one ground selection transistor connected in series between a bitline and a common source line (CSL). Here, each of the plurality of memory cells may be implemented to store at least one bit where wordlines WLs and bitlines BLs intersect each other. In an example embodiment, at least one dummy cell may be included between at least one string selection transistor and the plurality of memory cells. In an example embodiment, at least one dummy cell may be included between the plurality of memory cells and the at least one ground selection transistor.

The address decoder 102 may be implemented to select one of the plurality of memory blocks BLK1 to BLKz in response to an address. In addition, the address decoder 102 may be connected to the memory cell array 101 via the wordlines WLs, the at least one string selection line SSL, and the at least one ground selection line GSL. The address decoder 102 may select wordlines WLs, a string selection line SSL, and a ground select line GSL using a decoded row address. In addition, the address decoder 102 may decode a column address among input addresses. The column address decoded herein may be transmitted to the input/output circuit 104. In an example embodiment, the address decoder 102 may include a row decoder, a column decoder, an address buffer, and the like.

The voltage generation circuit 103 may be implemented to generate voltages (program voltage, pass voltage, read voltage, read pass voltage, verify voltage, erase voltage, common source line voltage, well voltage, and the like) necessary for an operation. The voltage generation circuit 103 may generate a wordline voltage necessary for a program/read/erase operation.

The input/output circuit 104 may be connected to the memory cell array 101 via the bitlines BLs. The input/output circuit 104 may be implemented to receive a decoded column address from the address decoder 102. The input/output circuit 104 may select the bitlines BLs using the decoded column address. The input/output circuit 104 may include a plurality of page buffers storing data to be programmed when a program operation is performed or storing data read when a read operation is performed. Here, each of the plurality of page buffers may include a plurality of latches. When the program operation is performed, data, stored in the page buffers, may be programmed into a page corresponding to a memory block selected via the bitlines BLs. When the read operation is performed, data, read from the page corresponding to the selected memory block, may be stored in the page buffers via the bitlines BLs. The input/output circuit 104 may read data from a first region of the memory cell array 101, and may store the read data in a second region of the memory cell array 101. For example, the input/output circuit 104 may be implemented to perform copy-back.

The control logic 105 may be implemented to control overall operations (program/read/erase, and the like) of the nonvolatile memory device NVM. The control logic 105 may operate in response to control signals or commands input from the outside.

Figure 13:
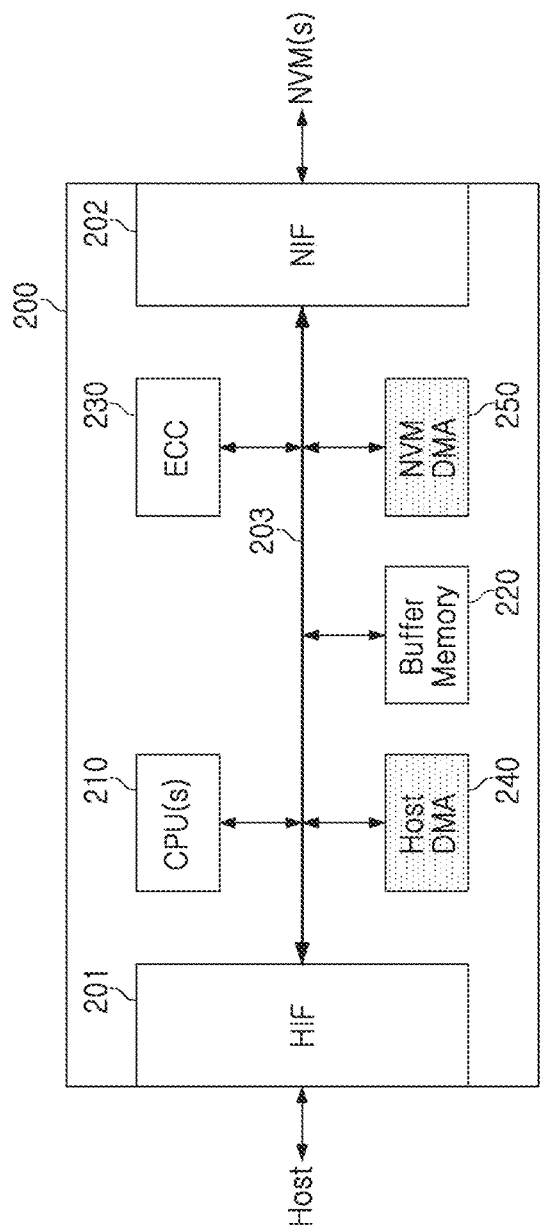
FIG. 13 is a diagram illustrating a controller 200 according to an example embodiment.

FIG. 13 is a diagram illustrating a controller 200 according to an example embodiment. Referring to FIG. 13, the controller 200 may include a host interface circuit (HIF) 201, a nonvolatile memory interface circuit (NIF) 202, a bus 203, at least one processor (CPU(s)) 210, a buffer memory. 220, an ECC 230, a host direct memory access (DMA) circuit 240, and a nonvolatile memory DMA circuit 250. The controller 200 of FIG. 13 may correspond, for example, to the controller 200 shown in FIG. 11.

The host interface circuit (HIF) 201 may be implemented to transmit and receive a packet to and from a host. A packet, transmitted from the host to the host interface circuit 201, may include a command or data to be written in a nonvolatile memory device NVM. The packet, transmitted from the host interface circuit 201 to the host, may include a response to a command or data read from the nonvolatile memory device NVM.

A nonvolatile memory interface circuit (NIF) 202 may transmit, to the nonvolatile memory device NVM, data to be written in the nonvolatile memory device NVM or may receive data read from the nonvolatile memory device NVM. A nonvolatile memory interface circuit 202 may be implemented to comply with a standard such as JEDEC or ONFI.

At least one processor (CPU(s)) 210 may be implemented to control overall operations of the controller 200. The processor 210 may perform various management operations such as cache/buffer management, firmware management, garbage collection management, wear leveling management, data deduplication management, read refresh/reclaim management, bad block management, multi-stream management, mapping management of host data and a nonvolatile memory, quality of service (QOS) management, system resource allocation management, nonvolatile memory queue management, read level management, erase/program management, hot/cold data management, power loss protection management, dynamic thermal management, initialization management, redundant array of inexpensive disk (RAID) management, and the like. Such management operations may be implemented in terms of hardware, firmware, or software.

The buffer memory 220 may temporarily store data to be written in the nonvolatile memory device NVM or data read from the nonvolatile memory device NVM. In an example embodiment, the buffer memory 220 may be a component included in the controller 200. In an example embodiment, the buffer memory 220 may be disposed on the outside of the controller 200. In addition, the buffer memory 220 may be implemented as volatile memory (for example, static random access memory (SRAM), dynamic RAM (DRAM), synchronous RAM (SDRAM), or the like) or nonvolatile memory (flash memory, phase-change RAM (PRAM), magneto-resistive RAM (MRAM), resistive RAM (ReRAM), ferro-electric RAM (FRAM), or the like).

The error correction circuit (ECC) 230 may be implemented to generate an error correction code when a program operation is performed, and to restore data using the error correction code when a read operation is performed. That is, the error correction circuit 230 may generate an error correction code for correcting a fail bit or an error bit of data received from the nonvolatile memory device NVM. In addition, the error correction circuit 230 may perform error correction encoding on data provided to the nonvolatile memory device NVM, thereby forming data to which parity bits are added. The parity bits may be stored in the nonvolatile memory device NVM.

In addition, the error correction circuit 230 may perform error correction decoding on data output from the nonvolatile memory device NVM. The error correction circuit 230 may correct errors using parity. The error correction circuit 230 may correct errors using coded modulation such as a low-density parity check (LDPC) code, a BCH code, a turbo code, a reed-solomon code, a convolution code, a recursive systematic code (RSC), a trellis-coded modulation (TCM), a block coded modulation (BCM), or the like. When error correction by the error correction circuit 230 is not possible, a read retry operation may be performed.

The packet manager may generate a packet according to an interface protocol negotiated with the host or may parse various types of information from a packet received from the host. An encryption device may perform at least one of an encryption operation and a decryption operation on data input to the controller 200 using a symmetric-key algorithm. The encryption device may encrypt and decrypt data using an advanced encryption standard (AES) algorithm. The encryption device may include an encryption module and a decryption module. In an example embodiment, the encryption device may be implemented in terms of hardware, software, or firmware. The encryption device may perform a self-encryption disk (SED) function or a trusted computing group (TCG) security function. The SED function may store encrypted data in the nonvolatile memory device NVM using an encryption algorithm or may decrypt the encrypted data from the nonvolatile memory device NVM. The encryption/decryption operation may be performed using an internally generated encryption key. The TCG security function may provide a mechanism for enabling use of the storage device 10 and control of access to data. For example, the TCG security function may perform an authentication procedure between an external device and the storage device 10. In an example embodiment, the SED function or the TCG security function may be optionally selectable.

The host DMA circuit 240 may be implemented to control a DMA operation between a host device and the controller 200. The host DMA circuit 240 may store, in the buffer memory 220, data input from the host device via a host interface 201 when the program operation is performed under the control of a host controller. In addition, the host DMA circuit 240 may perform an operation of outputting data, stored in the buffer memory 220, to the host device via the host interface 201 when the read operation is performed. In an example embodiment, the host DMA circuit 240 may be implemented to be included in the host controller as a component of the host controller.

The nonvolatile memory DMA circuit 250 may be implemented to control a DMA operation between the controller 200 and the nonvolatile memory device NVM. The nonvolatile memory DMA circuit 250 may perform an operation of outputting data, stored in the buffer memory 220, to the nonvolatile memory device NVM via the nonvolatile memory interface circuit 202, when the program operation is performed, under the control of a nonvolatile memory controller. In addition, the nonvolatile memory DMA circuit 250 may perform an operation of reading data, stored in the nonvolatile memory device NVM, via the nonvolatile memory interface circuit 202, when the read operation is performed.

In addition, the nonvolatile memory DMA circuit 250 may receive, from the nonvolatile memory interface circuit 202, at least one data group divided into read transfer units when the read operation is performed. The nonvolatile memory DMA circuit 250 may divide each data group into at least two data subgroups having a data size unit smaller than a read transfer unit. Here, the divided data subgroups may be data having an error corrected by the error correction circuit 230. In an example embodiment, when a first read pass is selected, at least two divided data subgroups may be transmitted to the host DMA circuit 240. In an example embodiment, when a second read pass is selected, at least two divided data subgroups may be sequentially transmitted to the buffer memory 220.

In addition, the nonvolatile memory DMA circuit 250 may output information notifying the start of read streaming to a buffer controller when data subgroups are transmitted to the buffer memory 220. For example, the nonvolatile memory DMA circuit 250 may be implemented to be included in the nonvolatile memory controller as a component of the nonvolatile memory controller.

Figure 14:
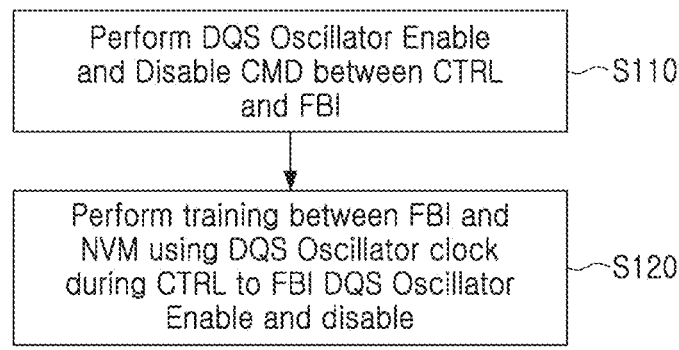
FIG. 14 is a flowchart illustrating an operation of a storage device according to an example embodiment.

FIG. 14 is a flowchart illustrating an operation of a storage device according to an example embodiment. Referring to FIGS. 3 to 14, an operation of the storage device may be performed as follows.

A storage device SSD may enable and disable a DQS oscillator between a controller CTRL and a buffer chip FBI (S110). The storage device SSD performs training using a DQS oscillator clock between the buffer chip FBI and a memory chip NVM while enabling and disabling the DQS oscillator between the controller CTRL and the buffer chip FBI (S120).

In an example embodiment, performing a DQS oscillator enable/disable operation may include receiving a specific command periodically/aperiodically from a controller CTRL, and enabling a DQS oscillator in response to the specific command.

In an example embodiment, in a write training operation, a buffer chip FBI may generate a DQS oscillator clock from a DQS oscillator, and the buffer chip FBI may transmit random data to a memory chip NVM using the DQS oscillator clock as a strobe clock DQS. Thereafter, the memory chip NVM may sample random data in response to the strobe clock DQS, may compare the sampled data with expected data, may determine a pass/failure according to a comparison result, and may control at least one delay chain according to the determined pass/failure, thereby aligning phases of the random data and the strobe clock DQS.

In an example embodiment, in a read training operation, a memory chip NVM may generate a DQS oscillator clock from a DQS oscillator, and may transmit random data to a buffer chip FBI using a DQS oscillator clock as a strobe clock DQS. Thereafter, the buffer chip FBI may sample random data in response to the strobe clock DQS, may compare the sampled data with expected data, may determine a pass/failure according to a comparison result, and may control at least one delay chain according to the determined pass/failure, thereby aligning phases of the random data and the strobe clock DQS.

In an example embodiment, a lock code according to a result of write training/read training may be stored.

Figure 15:
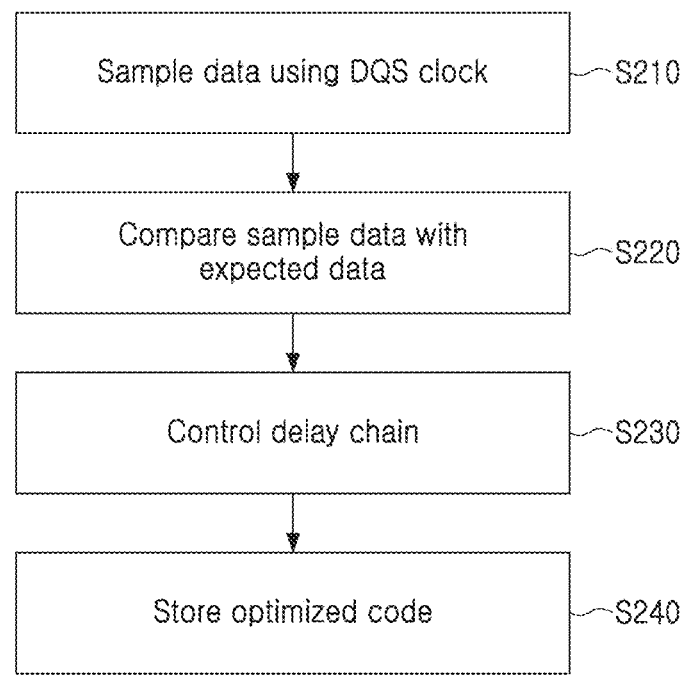
FIG. 15 is a flowchart illustrating a training operation of a storage device according to an example embodiment.

FIG. 15 is a flowchart illustrating a training operation of a storage device according to an example embodiment. Referring to FIG. 15, a training circuit (a write training circuit and/or a read training circuit of FIG. 3) of the storage device may sample data using a DQS clock (S210). Here, the DQS clock may be generated by a DQS oscillator based on a command received from a controller CTRL. The training circuit may determine a pass/failure according to a comparison result by comparing sample data with expected data (S220) and generate a delay code according to the pass/failure to control a delay chain (S230). The training circuit may store an optimal delay code (S240).

Figure 16:
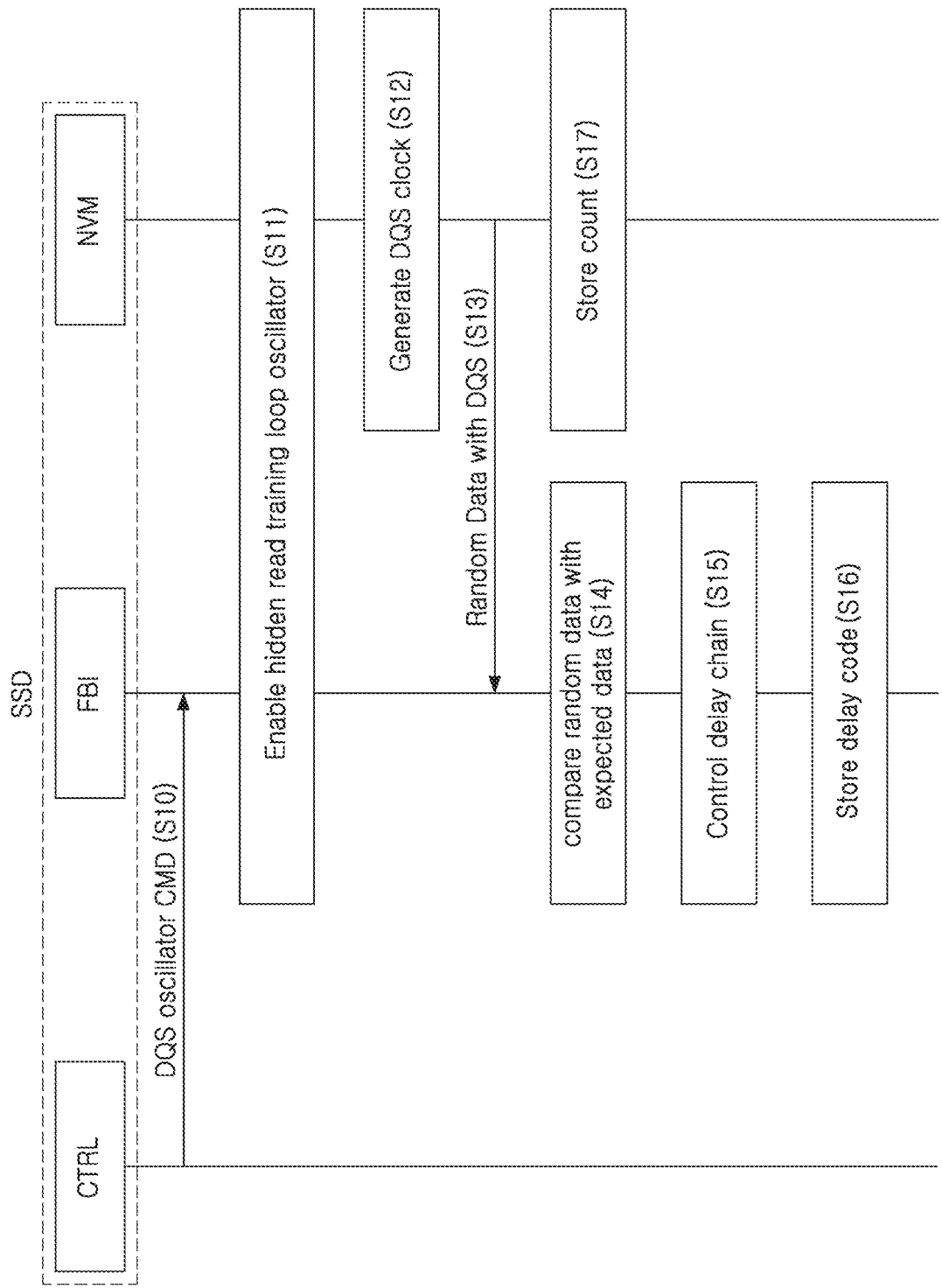
FIG. 16 is a ladder diagram illustrating a hidden read training process of a storage device SSD according to an example embodiment.

FIG. 16 is a ladder diagram illustrating a hidden read training process of a storage device SSD according to an example embodiment. Referring to FIG. 16, the hidden read training process of the storage device SSD may be performed as follows. A controller CTRL may periodically/aperiodically transmit a DQS oscillator command to a buffer chip FBI (S10). Here, the buffer chip FBI may enable/disable, in response to the DQS oscillator command, a DQS oscillator, and may perform a corresponding count monitoring operation. At the same time, a hidden read training loop may be enabled between the buffer chip FBI and a memory chip NVM (S11). Subsequently, the memory chip NVM may generate a DQS clock (S12). The memory chip NVM may output random data to the buffer chip FBI, together with the DQS clock (S13). The buffer chip FBI may sample random data and compare the sampled data with expected data (S14). The buffer chip FBI may control a delay chain with a delay code corresponding to a comparison result (S15). Thereafter, the buffer chip FBI may store the delay code (S16). In addition, the memory chip NVM may store a count value (S17).

Figure 17:
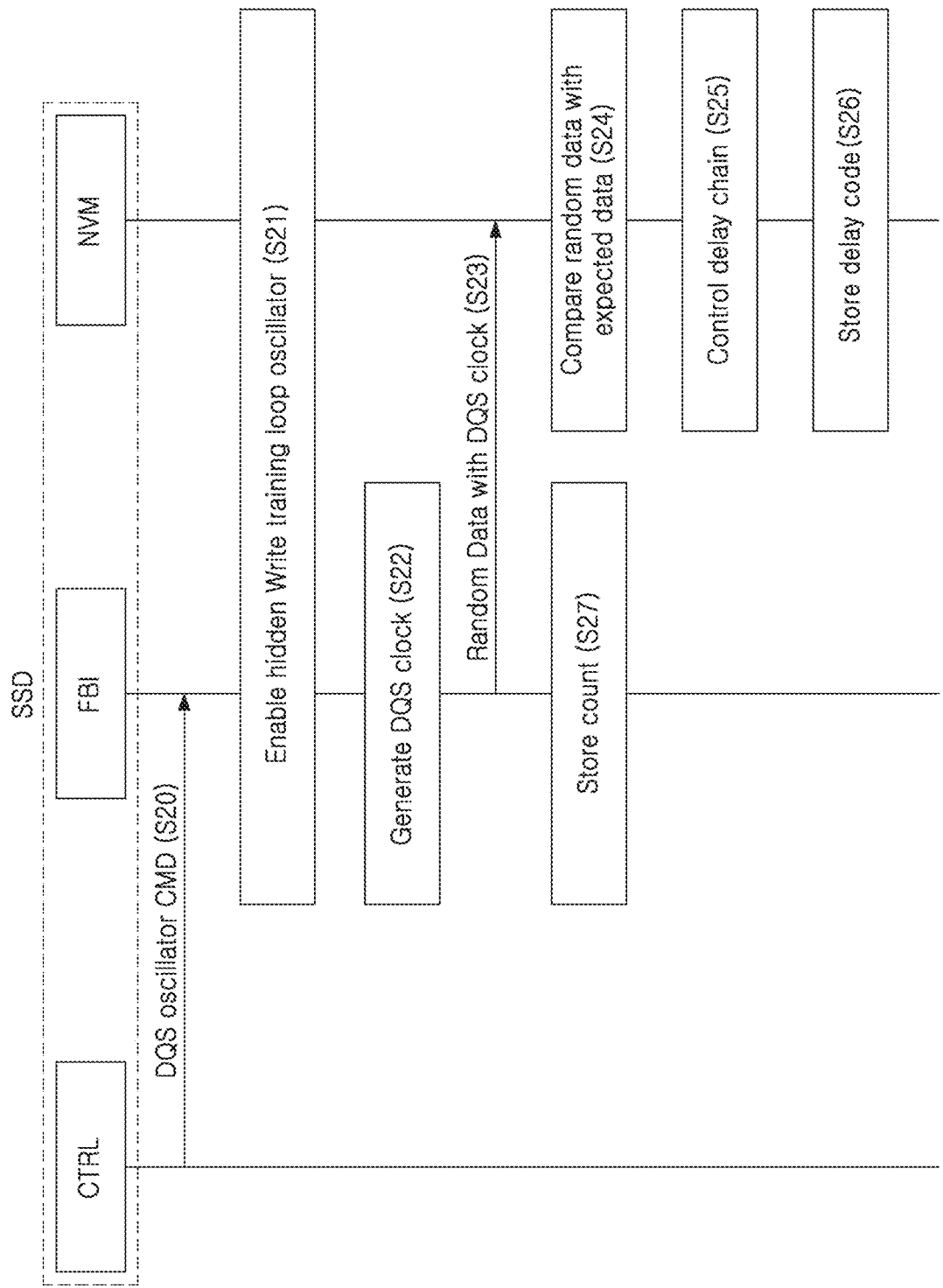
FIG. 17 is a ladder diagram illustrating a hidden write training process of a storage device SSD according to an example embodiment.

FIG. 17 is a ladder diagram illustrating a hidden write training process of a storage device SSD according to an example embodiment. Referring to FIG. 17, the hidden write training process of the storage device SSD may be performed as follows. A controller CTRL may periodically/aperiodically transmit a DQS oscillator command to a buffer chip FBI (S20). Here, the buffer chip FBI may enable/disable, in response to the DQS oscillator command, a DQS oscillator, and may perform a corresponding count monitoring operation. At the same time, a hidden write training loop may be enabled between the buffer chip FBI and a memory chip NVM (S21). Thereafter, the buffer chip FBI may generate a DQS clock (S22). Thereafter, the buffer chip FBI may output random data to the memory chip NVM, together with the DQS clock (S23).

Thereafter, the memory chip NVM may sample random data and compare the sampled data with expected data (S24). The memory chip NVM may control a delay chain with a delay code corresponding to a comparison result (S25). Thereafter, the memory chip NVM may store the delay code (S26). In addition, the buffer chip FBI may store a count value (S27).

Also, a nonvolatile memory device NVM according to an example embodiment may be implemented as a vertical memory device.

Figure 18:
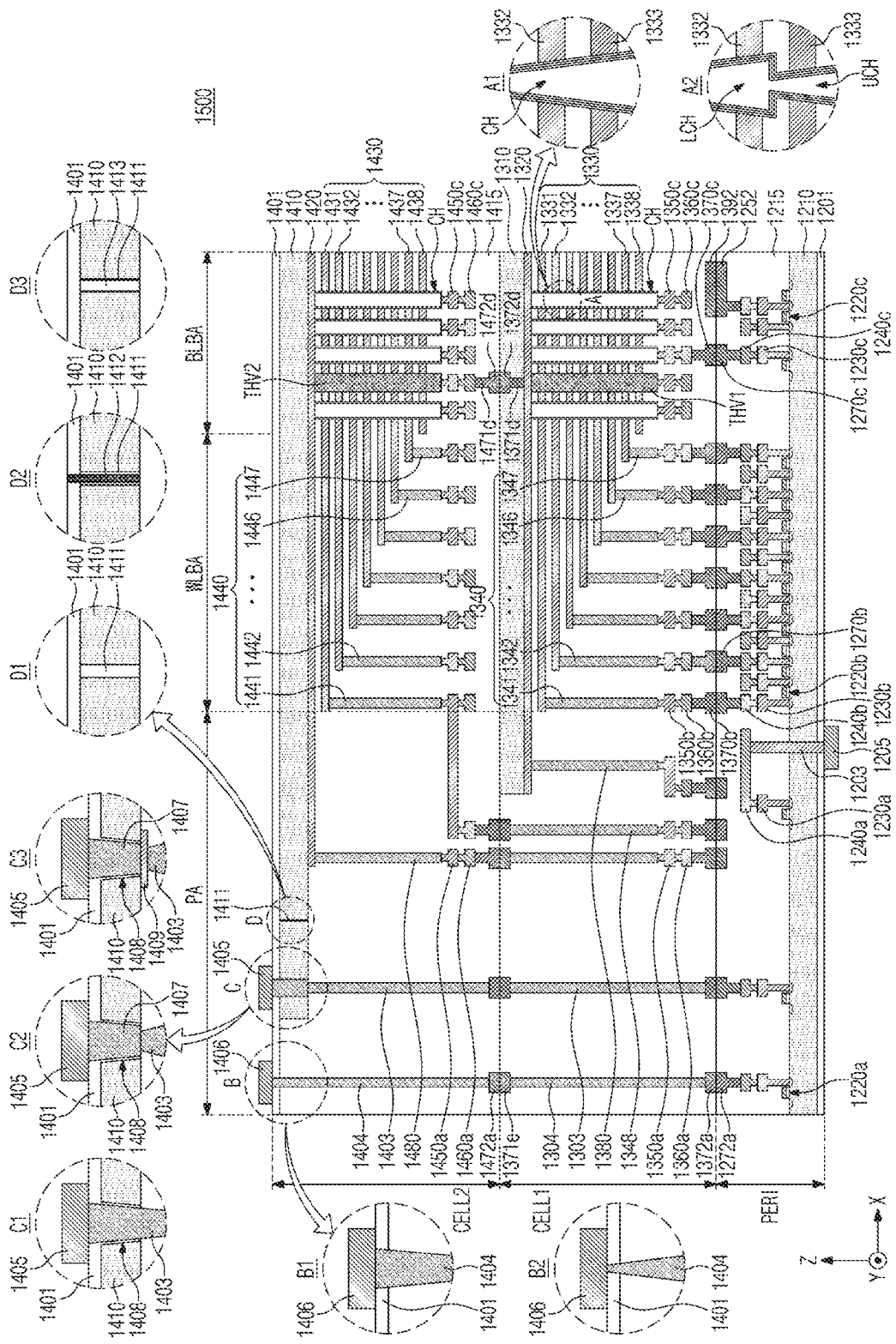
FIG. 18 is a diagram illustrating a nonvolatile memory device according to an example embodiment.

FIG. 18 is a diagram illustrating a nonvolatile memory device according to an example embodiment. Referring to FIG. 18, a nonvolatile memory device 1500 may have a chip to chip (C2C) structure. Here, the C2C structure may mean that at least one upper chip including a cell region CELL and at least one lower chip including a peripheral circuit region PERI are manufactured, respectively, and then the at least one upper chip and the at least one lower chip are connected to each other using a bonding method. In an example embodiment, the bonding method may refer to a method of electrically or physically connecting, to each other, a bonding metal pattern formed on an uppermost metal layer of an upper chip and a bonding metal pattern formed on an uppermost metal layer of a lower chip. For example, when the bonding metal patterns are formed of copper (Cu), the bonding method may be a Cu—Cu bonding method. In another example embodiment, the bonding metal patterns may also be formed of aluminum (Al) or tungsten (W).

The nonvolatile memory device 2500 may include at least one upper chip including a cell region. For example, as illustrated in FIG. 18, the nonvolatile memory device 1500 may be implemented to include two upper chips. However, such a configuration is an example, and the number of upper chips is not limited thereto. When the nonvolatile memory device 1500 is implemented to include two upper chips, a first upper chip including a first cell region CELL1, a second upper chip including a second cell region CELL2, and a lower chip including the peripheral circuit region PERI are respectively manufactured, the first upper chip, the second upper chip, and the lower chip may be connected to each other using the bonding method, such that the nonvolatile memory device 1500 may be manufactured. The first upper chip may be inverted and connected to the lower chip using the bonding method, and the second upper chip may also be inverted and connected to the first upper chip using the bonding method. In the following description, upper and lower portions of the first and second upper chips may be defined on the basis of a specific time before the first upper chip and the second upper chip are inverted. That is, in FIG. 18, an upper portion of the lower chip may refer to an upper portion defined with respect to a +Z-axis direction, and an upper portion of each of the first and second upper chips may refer to an upper part defined with respect to a −Z-axis direction. However, such a configuration is an example, and only one of the first upper chip and the second upper chip may be inverted and connected using the bonding method.

Each of the peripheral circuit region PERI and the first and second cell regions CELL1 and CELL2 of the nonvolatile memory device 1500 may include an external pad bonding region PA, a wordline bonding region WLBA, and a bitline bonding region (BLBA).

The peripheral circuit region PERI may include a first substrate 1210 and a plurality of circuit elements 1220a, 1220b, and 1220c formed on the first substrate 1210. An interlayer insulating layer 1215 including one or more insulating layers may be provided on the plurality of circuit elements 1220a, 1220b, and 1220c. A plurality of metal interconnections connecting, to each other, the plurality of circuit elements 1220a, 1220b, and 1220c may be provided within the interlayer insulating layer 1215. For example, the plurality of metal interconnections may include first metal interconnections 1230a, 1230b, and 1230c respectively connected to the plurality of circuit elements 1220a, 1220b, and 1220c, and second metal interconnections 1240a, 1240b, and 1240c formed on the first metal interconnections 1230a, 1230b, and 1230c. The plurality of metal interconnections may be formed of at least one of various conductive materials. For example, the first metal interconnections 1230a, 1230b, and 1230c may be formed of tungsten having relatively high electrical resistivity, and the second metal interconnections 1240a, 1240b, and 1240c may be formed of copper having relatively low electrical resistivity.

Here, only the first metal interconnections 1230a, 1230b, and 1230c and the second metal interconnections 1240a, 1240b, and 1240c are illustrated and described, but the present inventive concept is not limited thereto, and at least one additional metal interconnection may be further formed on the second metal interconnections 1240a, 1240b, and 1240c. In this case, the second metal interconnections 1240a, 1240b, and 1240c may be formed of aluminum. In addition, at least a portion of the additional metal interconnections formed on the second metal interconnections 1240a, 1240b, and 1240c may be formed of copper or the like having electrical resistivity lower than that of aluminum of the second metal interconnections 1240a, 1240b, and 1240c.

The interlayer insulating layer 1215 may be disposed on the first substrate 2210, and may include an insulating material such as silicon oxide, silicon nitride, or the like.

Each of the first and second cell regions CELL1 and CELL2 may include at least one memory block. The first cell region CELL1 may include a second substrate 1310 and a common source line 1320. A plurality of wordlines 1330 (1331 to 1338) may be stacked on the second substrate 2310 in a direction (Z-axis direction), perpendicular to an upper surface of the second substrate 1310. String selection lines and a ground selection line may be disposed on upper portions and lower portions of the wordlines 1330, and the plurality of wordlines 1330 may be disposed between the string selection lines and the ground selection line. Similarly, the second cell region CELL2 may include a third substrate 1410 and a common source line 1420, and a plurality of wordlines 1430 (1431 to 1438) may be stacked in a direction (Z-axis direction), perpendicular to an upper surface of the third substrate 1410. The second substrate 1310 and the third substrate 1410 may be made of various materials, for example, a silicon substrate, a silicon-germanium substrate, a germanium substrate, or a substrate having a monocrystalline epitaxial layer grown on a monocrystalline silicon substrate. A plurality of channel structures CH may be formed in each of the first and second cell regions CELL1 and CELL2.

In an example embodiment, as illustrated in A1, a channel structure CH may be provided to a bitline bonding region BLBA, and may extend in the direction, perpendicular to the upper surface of the second substrate 1310, to pass through the wordlines 1330, string selection lines, and a ground selection line. The channel structure CH may include a data storage layer, a channel layer, and a buried insulating layer. The channel layer may be electrically connected to a first metal interconnection 1350*c* and a second metal interconnection 1360*c* in the bitline bonding region BLBA. For example, the second metal interconnection 1360*c* may be a bitline, and may be connected to the channel structure CH via the first metal interconnection 2350*c*. A bitline 1360*c* may extend in a first direction (Y-axis direction), parallel to the upper surface of the second substrate 1310.

In an example embodiment, as illustrated in A2, the channel structure CH may include a lower channel LCH and an upper channel UCH connected to each other. For example, the channel structure CH may be formed via a process for the lower channel LCH and a process for the upper channel UCH. The lower channel LCH may extend in a direction perpendicular to the upper surface of the second substrate 1310 to pass through the common source line 1320, and lower wordlines 1331 and 1332. The lower channel LCH may include a data storage layer, a channel layer, and a buried insulating layer, and may be connected to the upper channel UCH. The upper channel UCH may pass through upper wordlines 1333 to 1338. The upper channel UCH may include a data storage layer, a channel layer, and a buried insulating layer, and the channel layer of the upper channel UCH may be electrically connected to the first metal interconnection 1350*c* and the second metal interconnection 1360*c*. As a channel length increases, it may be difficult to form a channel having a predetermined width due to process reasons. The nonvolatile memory device 1500 according to an example embodiment may include a channel having improved width uniformity via the lower channel LCH and the upper channel UCH formed via a sequential process.

As illustrated in A2, when the channel structure CH is formed to include the lower channel LCH and the upper channel UCH, a wordline positioned in the vicinity of a boundary between the lower channel LCH and the upper channel UCH is a dummy wordline. For example, a wordline 1332 and a wordline 1333, forming the boundary between the lower channel LCH and the upper channel UCH, may be dummy wordlines. In this case, data may not be stored in memory cells connected to the dummy wordline. Alternatively, the number of pages, corresponding to the memory cells connected to the dummy wordline, may be less than the number of pages corresponding to memory cells connected to a general wordline. A voltage level applied to the dummy wordline may be different from a voltage level applied to the general wordline, thereby reducing the effect of a non-uniform channel width between the lower channel LCH and the upper channel UCH on an operation of the memory device.

A2 illustrates the number of lower wordlines 1331 and 1332 through which the lower channel LCH passes is less than the number of upper wordlines 1333 to 1338 through which the upper channel UCH passes. However, such a configuration is exemplary, and the present inventive concept is not limited thereto. In another example embodiment, the number of lower wordlines, passing through the lower channel LCH, may be equal to or greater than the number of upper wordlines, passing through the upper channel UCH. In addition, the above-described structure and connection relationship of the channel structure CH disposed in the first cell region CELL1 may be applied to the channel structure CH disposed in the second cell region CELL2 in the same manner.

In the bitline bonding region BLBA, a first through-electrode THV1 may be provided in the first cell region CELL1, and a second through-electrode THV2 may be provided in the second cell region CELL2. As illustrated in 18, the first through-electrode THV1 may pass through the common source line 1320 and the plurality of wordlines 1330. However, such a configuration is an example, and the first through-electrode THV1 may further pass through the second substrate 2310. The first through-electrode THV1 may include a conductive material. Alternatively, the first through-electrode THV1 may include a conductive material surrounded by an insulating material. The second through-electrode THV2 may also have a shape and structure the same as those of the first through-electrode THV1.

In an example embodiment, the first through-electrode THV1 and the second through-electrode THV2 may be electrically connected via the first through-metal pattern 1372*d* and the second through-metal pattern 1472*d*. The first through-metal pattern 1372*d* may be formed on a lower end of a first upper chip including the first cell region CELL1, and the second through-metal pattern 1472*d* may be formed on an upper end of a second upper chip including the second cell region CELL2. The first through-electrode THV1 may be electrically connected to the first metal interconnection 1350*c* and the second metal interconnection 1360*c*. A lower via 1371*d* may be formed between the first through-electrode THV1 and the first through-metal pattern 1372*d*, and an upper via 1471*d* may be formed between the second through-electrode THV2 and the second through-metal pattern 1472*d*. The first through-metal pattern 1372*d* and the second through-metal pattern 1472*d* may be connected to each other using a bonding method.

In addition, in the bitline bonding region BLBA, an upper metal pattern 1252 may be formed on an uppermost metal layer of the peripheral circuit region PERI, and an upper metal pattern 1392, having a shape the same as that of the upper metal pattern 1252, may be formed on an uppermost metal layer of the first cell region CELL1. The upper metal pattern 1392 of the first cell region CELL1 and the upper metal pattern 1252 of the peripheral circuit region PERI may be electrically connected to each other using the bonding method. In the bitline bonding region BLBA, the bitline 1360*c* may be electrically connected to a page buffer included in the peripheral circuit region PERI. For example, a portion of circuit elements 1220*c* of the peripheral circuit region PERI may provide the page buffer, and the bitline 1360*c* may be electrically connected to the circuit elements 1220*c*, providing the page buffer via an upper bonding metal 1370*c* of the first cell region CELL1 and an upper bonding metal 1270*c* of the peripheral circuit region PERI.

Continuing to refer to FIG. 18, in the wordline bonding region WLBA, the wordlines 1330 of the first cell region CELL1 may extend in a second direction (X-axis direction), parallel to the upper surface of the second substrate 1310, and may be connected to a plurality of cell contact plugs 1340 (1341 to 1347). A first metal interconnection 1350*b* and a second metal interconnection 1360*b* may be sequentially connected to upper portions of the cell contact plugs 1340, connected to the wordlines 1330. In the wordline bonding region WLBA, the cell contact plugs 1340 may be connected to the peripheral circuit region PERI via an upper bonding metal 1370*b* of the first cell region CELL1 and an upper bonding metal 1270*b* of the peripheral circuit region PERI.

The cell contact plugs 1340 may be electrically connected to a row decoder included in the peripheral circuit region PERI. For example, a portion of circuit elements 1220*b* of the peripheral circuit region PERI may provide the row decoder, and the cell contact plugs 1340 may be electrically connected to the circuit elements 1220*b*, providing the row decoder via the upper bonding metal 1370*b* of the first cell region CELL1 and the upper bonding metal 1270*b* of the peripheral circuit region PERI. In an example embodiment, operation voltages of the circuit elements 1220*b*, providing the row decoder, may be different from operation voltages of the circuit elements 1220*c*, providing the page buffer. For example, the operation voltages of circuit elements 1220*c*, providing the page buffer, may be higher than operation voltages of the circuit elements 1220*b*, providing the row decoder.

Similarly, in the wordline bonding region WLBA, the wordlines 1430 of the second cell region CELL2 may extend in a second direction (X-axis direction), parallel to the upper surface of the third substrate 1410, and may be connected to a plurality of cell contact plugs 1440 (1441 to 1447). The cell contact plugs 1440 may be connected to the peripheral circuit region PERI via an upper metal pattern of the second cell region CELL2, lower and upper metal patterns of the first cell region CELL1, and a cell contact plug 1348.

In the wordline bonding region WLBA, the upper bonding metal 1370*b* may be formed in the first cell region CELL1, and the upper bonding metal 1270*b* may be formed in the peripheral circuit region PERI. The upper bonding metal 1370*b* of the first cell region CELL1 and the upper bonding metal 1270*b* of the peripheral circuit region PERI may be electrically connected to each other using the bonding method. The upper bonding metal 1370*b* and the upper bonding metal 1270*b* may be formed of aluminum, copper, tungsten, or the like.

In the external pad bonding region PA, a lower metal pattern 1371*e* may be formed in a lower portion of the first cell region CELL1, and an upper metal pattern 1472*a* may be formed in an upper portion of the second cell region CELL2. In the external pad bonding region PA, the lower metal pattern 1371*e* of the first cell region CELL1 and the upper metal pattern 1472*a* of the second cell region CELL2 may be connected to each other using the bonding method. Similarly, an upper metal pattern 1372*a* may be formed in an upper portion of the first cell region CELL1, and an upper metal pattern 1272*a* may be formed in an upper portion of the peripheral circuit region PERI. The upper metal pattern 1372*a* of the first cell region CELL1 and the upper metal pattern 1272*a* of the peripheral circuit region PERI may be connected to each other using the bonding method.

Common source line contact plugs 1380 and 1480 may be disposed in the external pad bonding region PA. The common source line contact plugs 1380 and 1480 may be formed of a conductive material such as a metal, a metal compound, doped polysilicon, or the like. The common source line contact plug 1380 of the first cell region CELL1 may be electrically connected to the common source line 1320, and the common source line contact plug 1480 of the second cell region CELL2 may be electrically connected to the common source line 1420. A first metal interconnection 1350*a* and a second metal interconnection 1360*a* may be sequentially stacked on the common source line contact plug 1380 of the first cell region CELL1, and a first metal interconnection 1450*a* and a second metal interconnection 1460*a* may be sequentially stacked on the common source line contact plug 1480 of the second cell region CELL2.

First to third input/output pads 1205, 1405, and 1406 may be disposed in the external pad bonding region PA. Referring to FIG. 18, a lower insulating film 1201 may cover a lower surface of the first substrate 1210, and a first input/output pad 1205 may be formed on the lower insulating film 1201. The first input/output pad 1205 may be connected to at least one of the plurality of circuit elements 1220*a* disposed in the peripheral circuit region PERI via a first input/output contact plug 1203, and may be isolated from the first substrate 1210 by the lower insulating film 1201. In addition, a side insulating film may be disposed between the first input/output contact plug 1203 and the first substrate 1210 to electrically isolate, from each other, the first input/output contact plug 1203 and the first substrate 1210.

An upper insulating film 1401, covering the upper surface of the third substrate 1410, may be formed on an upper portion of third substrate 1410. A second input/output pad 1405 or a third input/output pad 1406 may be disposed on the upper insulating film 1401. The second input/output pad 1405 may be connected to at least one of the plurality of circuit elements 1220*a* disposed in the peripheral circuit region PERI via second input/output contact plugs 1403 and 1303, and the third input/output pad 1406 may be connected to at least one of the plurality of circuit elements 1220*a* disposed in the peripheral circuit region PERI via third input/output contact plugs 1404 and 1304.

In an example embodiment, the third substrate 1410 may not be disposed in a region in which an input/output contact plug is disposed. For example, as illustrated in B, the third input/output contact plug 1404 may be isolated from the third substrate 1410 in a direction, parallel to the upper surface of the third substrate 1410, and may pass through an interlayer insulating layer 1415 of the second cell region CELL2 to be connected to the third input/output pad 1406. In this case, the third input/output contact plug 1404 may be formed using various processes.

As illustrated in B1, the third input/output contact plug 1404 may extend in a third direction (Z-axis direction), and may have a larger diameter toward the upper insulating film 1401. That is, while a diameter of the channel structure CH described with reference to A1 is formed to decrease toward the upper insulating film 1401, a diameter of the third input/output contact plug 1404 may be formed to increase toward the upper insulating film 1401. For example, the third input/output contact plug 2404 may be formed after the second cell region CELL2 and the first cell region CELL1 are bonded to each other using the bonding method.

In addition, as illustrated in B2, the third input/output contact plug 1404 may extend in the third direction (Z-axis direction), and may have a smaller diameter toward the upper insulating film 1401. That is, the diameter of the third input/output contact plug 1404 may be formed to decrease toward the upper insulating layer film in the same manner as the channel structure CH. For example, the third input/output contact plug 1404 may be formed together with the cell contact plugs 1440 before the second cell region CELL2 and the first cell region CELL1 are bonded to each other.

In an example embodiment, the input/output contact plug may be disposed to overlap the third substrate 1410. For example, as illustrated in C, the second input/output contact plug 1403 may be formed to pass through the interlayer insulating layer 1415 of the second cell region CELL2 in the third direction (Z-axis direction), and may be electrically connected to the second input/output pad 1405 via the third substrate 1410. In this case, a connection structure between the second input/output contact plug 1403 and the second input/output pad 1405 may be implemented in various manners.

As illustrated in C1, an opening 1408, passing through the third substrate 1410, may be formed, and the second input/output contact plug 1403 may be directly connected to the second input/output pad 1405 via the opening 1408 formed in the third substrate 1410. In this case, as illustrated in C1, the second input/output contact plug 1403 may have a larger diameter toward the second input/output pad 1405. However, such a configuration is an example, and the second input/output contact plug 1403 may also have a smaller diameter toward the second input/output pad 1405.

For example, as illustrated in C2, an opening 1408, passing through the third substrate 1410, may be formed, and a contact 1407 may be formed in the opening 1408. One end of the contact 1407 may be connected to the second input/output pad 1405 and the other end may be connected to the second input/output contact plug 1403. Accordingly, the second input/output contact plug 1403 may be electrically connected to the second input/output pad 1405 via the contact 1407 in the opening 1408. In this case, as illustrated in C2, the contact 1407 may have a larger diameter toward the second input/output pad 1405, and the second input/output contact plug 1403 may have a smaller diameter toward the second input/output pad 1405. For example, the second input/output contact plug 1403 may be formed together with the cell contact plugs 1440 before the second cell region CELL2 and the first cell region CELL1 are bonded to each other, and the contact 1407 may be formed after the second cell region CELL2 and the first cell region CELL1 are bonded to each other.

In addition, as illustrated in C3, a stopper 1409 may be further formed on an upper surface of the opening 1408 of the third substrate 1410, as compared to C2. The stopper 1409 may be a metal interconnection formed on a layer the same as pluralities the common source line 1420. However, such a configuration is an example, and the stopper 1409 may be a metal interconnection formed on a layer the same as at least one of the wordlines 1430. The second input/output contact plug 1403 may be electrically connected to the second input/output pad 1405 via the contact 1407 and the stopper 1409.

In a similar manner to the second and third input/output contact plugs 1403 and 1404 of the second cell region CELL2, the second and third input/output contact plugs 1303 and 1304 of the first cell region CELL1 may respectively have a smaller diameter toward the lower metal pattern 1371e, or may respectively a larger diameter toward the lower metal pattern 1371e.

In some example embodiments, a slit 1411 may be formed in the third substrate 1410. For example, the slit 1411 may be formed in an arbitrary position of the external pad bonding region PA. In an example embodiment, as illustrated in D, the slit 1411 may be positioned between the second input/output pad 1405 and the cell contact plugs 1440 in plan view. However, such a configuration is an example, and the slit 1411 may be formed such that the second input/output pad 1405 is positioned between the slit 1411 and the cell contact plugs 1440 in plan view.

As illustrated in D1, the slit 1411 may be formed to pass through the third substrate 1410. The slit 1411 may be used, for example, to prevent the third substrate 1410 from being slightly cracked when the opening 1408 is formed. However, such a configuration is an example, and the slit 1411 may be formed to a depth of about 60 to 70% with respect to a thickness of the third substrate 1410.

In addition, as illustrated in D2, a conductive material 1412 may be formed in the slit 1411. The conductive material 1412 may be used, for example, to discharge, to the outside, leakage current generated during driving of circuit elements in the external pad bonding region PA. In this case, the conductive material 1412 may be connected to an external ground line.

In addition, as illustrated in D3, an insulating material 1413 may be formed in the slit 1411. The insulating material 1413 may be formed to, for example, electrically isolate, from the wordline bonding region WLBA, the second input/output pad 1405 and the second input/output contact plug 1403 disposed in the external pad bonding region PA. The insulating material 1413 may be formed in the slit 1411, thereby blocking the voltage provided via the second input/output pad 1405 from affecting a metal layer disposed on the third substrate 1410 in the wordline bonding region WLBA.

In some example embodiments, the first to third input/output pads 1205, 1405, and 1406 may be selectively formed. For example, the nonvolatile memory device 1500 may be implemented to include only the first input/output pad 1205 disposed on an upper portion of the first substrate 1210, to include only the second input/output pad 1405 disposed on an upper portion of the third substrate 1410, or to include only the third input/output pad 1406 disposed on an upper portion of the upper insulating film 1401.

In some example embodiments, at least one of the second substrate 1310 of the first cell region CELL1 and the third substrate 1410 of the second cell region CELL2 may be used as a sacrificial substrate, and may be entirely or partially removed before or after a bonding process is performed. An additional film may be deposited after substrate removal. For example, the second substrate 1310 of the first cell region CELL1 may be removed before or after bonding of the peripheral circuit region PERI and the first cell region CELL1, and an insulating film, covering an upper surface of the common source line 1320, or a conductive film for connection may be formed. Similarly, the third substrate 1410 of the second cell region CELL2 may be removed before or after bonding of the first cell region CELL1 and the second cell region CELL2, and the upper insulating film 1401, covering an upper surface of the common source line 1420, or a conductive film for connection may be formed.

The device described above may be implemented as a hardware component, a software component, and/or a combination of the hardware component and the software component. For example, a device and a component according to example embodiments may be implemented using one or more general purpose or special purpose computers, such as a processor, controller, arithmetic logic unit (ALU), digital signal processor, microcomputer, field programmable gate array (FPGA), a programmable logic unit (PLU), microprocessor, or any other device capable of executing and responding to instructions. A processing device may include an operating system (OS) and one or more software applications executed on the operating system. In addition, the processing device may also access, store, manipulate, process, and generate data in response to execution of software. For ease of understanding, in some case, it is described that the processing device is used a single processing element, but those skilled in the art could recognize that the processing device may include a plurality of processing elements or multiple types of processing elements. For example, the processing device may include a plurality of processors, or one processor and one controller. In addition, other processing configurations are also possible, such as parallel processors.

The software may include a computer, a code, an instruction, or one or more combinations thereof, and may configure the processing device to operate as desired, or may independently or collectively instruct the processing device. The software and/or data may be embodied in any type of machine, component, physical device, virtual equipment, computer storage medium, or device so as to be interpreted by the processing device, or to provide instructions or data to the processing device. The software may also be distributed on a computer system via a network, and may be stored or executed in a distributed manner. The software and data may be stored on one or more computer-readable recording media.

The specifications of a standard storage device (e.g., a conventional storage device) might support read and write training between a controller and a buffer chip, but may not provide for training between slave chips (e.g., a buffer chip and a NAND die). Additionally, DQS oscillator monitoring might be supported by the Toggle 6.0 standard between the controller and the buffer chip. However, there may not be any training occurring between the slave chips. A bottleneck could occur in the signal integrity between the slave chips, thereby affecting speed performance. Hence, training between slave chips could be essential. Additionally, prior art may utilize a read training DQS clock and fetch DQ data from a controller using an nRE clock. Write training between a buffer chip and a NAND memory chip may not be achievable without a controller clock. Moreover, in prior art, a master chip (controller) may perform write training of a memory chip to enhance a write data valid window. Despite these capabilities, the prior art does not propose a solution for read and write training between slave chips.

In contrast, a storage device according to an example embodiment may support read/write training for both master and slave chips. Each of the slave chips (a memory chip (NAND) and a buffer chip FBI) in this embodiment may contain a DQS oscillator, MUX, RX, delay chain, comparator and training circuit, counter, register, sampler, and expected data register. In such an embodiment, within a composite chip that includes a memory chip (NAND) and a buffer chip (positioned between the memory and another chip), a method for read/write training of data and a strobe clock may output random data and a strobe clock using a DQS OSC clock as a read/write clock (DQ/DQS) in an operation pattern of a DQS oscillator. A phase difference between the data and the strobe clock may be trained using a feedback loop. This loop may serve as a comparator with expected data from a receiving chip, delay chain, sampler, counter, comparator and training circuit, expected data register, and register, all within the operating radius of the DQS oscillator of an adjacent chip. The present inventive concept may have a data pattern for improving speed by improving a write data valid window and read and write training between a buffer chip and a memory die/chip using toggle/random data for each pin and for each die, without using a controller clock (nRE).

In a nonvolatile memory package, a storage device including the same, and a method of operating the same according to example embodiments of the present inventive concept, hidden write training or read training may be simultaneously performed between a buffer chip and a memory using a DQS oscillator clock while performing training between a controller and the buffer chip.

While example embodiments have been illustrated and described above, it will be apparent to those skilled in the art that modifications and variations could be made without departing from the scope of the present inventive concept.

What is claimed is:

1. A storage device comprising:
   a plurality of memory chips;
   a buffer chip connected to the plurality of memory chips; and
   a controller connected to the buffer chip,
   wherein the buffer chip is configured to periodically receive a first command from the controller, and perform a DQS oscillator enable operation in response to the first command, and
   at least one memory chip among the plurality of memory chips and the buffer chip are configured to perform write training or read training when the DQS oscillator enable operation is performed.

2. The storage device of claim 1, wherein the write training and the read training are performed using a DQS oscillator clock generated by the buffer chip or by the at least one memory chip.

3. The storage device of claim 1, wherein, in the write training, a DQS oscillator of the buffer chip is configured to generate a DQS oscillator clock to perform the write training.

4. The storage device of claim 3, wherein the buffer chip is configured to transmit test data to the at least one memory chip using the DQS oscillator clock as a strobe clock DQS.

5. The storage device of claim 4, wherein, in the write training, the at least one memory chip is configured to align phases of the test data and the strobe clock DQS by sampling the test data in response to the strobe clock DQS, comparing the sampled data with expected data, determining a pass/failure result according to a result of the comparison, and controlling at least one delay chain according to the determined pass/failure result.

6. The storage device of claim 1, wherein, in the read training, the at least one memory chip, among the plurality of memory chips, is configured to generate a DQS oscillator clock to perform the read training.

7. The storage device of claim 6, wherein the at least one memory chip is configured to transmit test data to the buffer chip using the DQS oscillator clock as a strobe clock DQS.

8. The storage device of claim 7, wherein, in the read training, the buffer chip is configured to align phases of the test data and the strobe clock DQS by sampling the test data in response to the strobe clock DQS, comparing the sampled data with expected data, determining a pass/failure according to a result of the comparison, and controlling at least one delay chain according to the determined pass/failure.

9. The storage device of claim 1, wherein the write training and the read training are configured to sample N−1-th and N-th test data in synchronization with a strobe clock DQS, output a first pass/failure result by comparing the sampled test data with N−1-th expected data, output a second pass/failure result by comparing the sampled test data with N-th expected data, generate a first sweep code corresponding to a conversion count value of the first pass/failure result, generate a second sweep code corresponding to a conversion count value of the second pass/failure result, and output a lock code of the strobe clock DQS using the first sweep code and the second sweep code.

10. The storage device of claim 1, wherein the write training and the read training are configured to perform first sampling on N-th test data to generate first sampled test data in synchronization with a rising edge of a strobe clock DQS, perform second sampling on N+1-th test data to generate second sampled test data in synchronization with a falling edge of the strobe clock DQS, output a first pass/failure result by comparing the first sampled test data with N-th expected data, output a second pass/failure result by comparing the second sampled test data with the N-th expected data, generate a first sweep code corresponding to each of a conversion count value of the first pass/failure result and a conversion count value of the second pass/failure result, generate a second sweep code corresponding to each of the conversion count value of the first pass/failure result and the conversion count value of the second pass/failure result, and output a lock code of the strobe clock DQS using the first sweep code and the second sweep code.

11. A method of operating a storage device, the method comprising:
performing a DQS oscillator enable/disable operation between a controller and a buffer chip; and
performing training between a memory chip and the buffer chip using a DQS oscillator clock generated by a DQS oscillator of the buffer chip or the memory chip while performing the DQS oscillator enable/disable operation.

12. The method of claim 11, wherein the performing the DQS oscillator enable/disable operation includes:
receiving a first command from the controller; and
enabling the DQS oscillator in response to the first command.

13. The method of claim 11, wherein the performing the training includes:
generating, by a DQS oscillator of the memory chip, a DQS oscillator clock;
transmitting, by the memory chip, test data to the buffer chip using the DQS oscillator clock as a strobe clock DQS; and
aligning phases of the test data and the strobe clock DQS by sampling, by the buffer chip, the test data in response to the strobe clock DQS, comparing the sampled data with expected data, determining a pass/failure result according to a result of the comparison, and controlling at least one delay chain according to the determined pass/failure result.

14. The method of claim 11, wherein the performing the training includes:
generating, by a DQS oscillator of the buffer chip, a DQS oscillator clock;
transmitting, by the buffer chip, test data to the memory chip using the DQS oscillator clock as a strobe clock DQS; and
aligning phases of the test data and the strobe clock DQS by sampling, by the memory chip, the test data in response to the strobe clock DQS, comparing the sampled data with expected data, determining a pass/failure result according to a result of the comparison, and controlling at least one delay chain according to the determined pass/failure result.

15. The method of claim 11, further comprising storing a lock code according to the training.

16. A nonvolatile memory package comprising:
a plurality of memory chips; and
a buffer chip connected to the plurality of memory chips, wherein the buffer chip includes:
a first sampler configured to sample read data transmitted from one of the plurality of memory chips when a read operation is performed;
a second sampler configured to sample write data transmitted from an external device when a program operation is performed;
a DQS oscillator configured to generate a strobe clock DQS in response to a first command; and
a counter and register configured to count the strobe clock DQS and store a counted value, and
wherein when the DQS oscillator is enabled in response to the first command, the buffer chip and at least one of the plurality of memory chips perform hidden read training or hidden write training.

17. The nonvolatile memory package of claim 16, wherein, in the hidden read training, each of the plurality of memory chips includes:
a register configured to store test data;
a first DQS oscillator configured to generate a first strobe clock DQS; and
a first counter and register configured to count the first strobe clock DQS and store a counted value.

18. The nonvolatile memory package of claim 17, wherein the buffer chip includes:
a first delay chain configured to delay, using a delay code, the test data received from one memory chip among the plurality of memory chips in the read training;
a second delay chain configured to delay, using the delay code, the first strobe clock DQS received from the one memory chip in the read training;
a sampler configured to sample the delayed test data in response to the delayed first strobe clock DQS when the read training is performed;
a compare and read training logic configured to compare the sampled data with expected data and output a pass/failure result corresponding to a result of the comparison; and
a counter and register configured to count a value corresponding to the output pass/failure result and store the delay code corresponding to the counted value.

19. The nonvolatile memory package of claim 16, wherein, in the hidden write training, each of the plurality of memory chips includes:
a first delay chain configured to delay, using a delay code, test data received from the buffer chip in the write training;
a second delay chain configured to delay, using the delay code, a second strobe clock DQS received from the buffer chip in the write training;
a sampler configured to sample the delayed test data in response to the delayed second strobe clock DQS in the write training;
a compare and write training logic configured to compare the sampled data with expected data and output a pass/failure result corresponding to a result of the comparison; and
a counter and register configured to count a value corresponding to the output pass/failure result and store the delay code corresponding to the counted value.

20. The nonvolatile memory package of claim 19, wherein the buffer chip includes:
a register configured to store the test data;
a second DQS oscillator configured to generate the second strobe clock DQS; and a second counter and register configured to count the second strobe clock DQS and store a counted value.

* * * * *